(12) United States Patent
Kim et al.

(10) Patent No.: US 12,288,877 B2
(45) Date of Patent: *Apr. 29, 2025

(54) RECHARGEABLE METAL HALIDE BATTERY WITH INTERCALATION ANODE

(71) Applicant: International Business Machines Corporation, Armonk, NY (US)

(72) Inventors: Jangwoo Kim, San Jose, CA (US); Andy Theodora Tek, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 118 days.

This patent is subject to a terminal disclaimer.

(21) Appl. No.: 16/927,815

(22) Filed: Jul. 13, 2020

(65) Prior Publication Data

US 2022/0013778 A1    Jan. 13, 2022

(51) Int. Cl.
    *H01M 4/58* (2010.01)
    *H01M 4/133* (2010.01)
    *H01M 4/62* (2006.01)
    *H01M 10/052* (2010.01)
    *H01M 10/0568* (2010.01)
    *H01M 10/0569* (2010.01)
    *H01M 4/02* (2006.01)

(52) U.S. Cl.
    CPC .......... *H01M 4/582* (2013.01); *H01M 4/133* (2013.01); *H01M 4/625* (2013.01); *H01M 10/052* (2013.01); *H01M 10/0568* (2013.01); *H01M 10/0569* (2013.01); *H01M 2004/027* (2013.01); *H01M 2004/028* (2013.01); *H01M 2300/0025* (2013.01)

(58) Field of Classification Search
CPC ........ H01M 4/582; H01M 4/58; H01M 4/136; H01M 4/386; H01M 4/134; H01M 4/133; H01M 4/583; H01M 4/587; H01M 4/663; H01M 10/0569; H01M 10/0568; H01M 2300/0025; H01M 2004/027; H01M 2004/028
See application file for complete search history.

(56) References Cited

U.S. PATENT DOCUMENTS

| | | | |
|---|---|---|---|
| 3,540,934 A | 11/1970 | Boeke | |
| 3,793,079 A | 2/1974 | Brown et al. | |
| 3,994,745 A | 11/1976 | Ludwig | |
| 4,020,246 A | 4/1977 | Seo et al. | |
| 4,296,185 A | 10/1981 | Catanzarite | |
| 4,513,067 A | 4/1985 | Kuo et al. | |
| 5,510,209 A | 4/1996 | Abraham et al. | |
| 6,946,215 B2 | 9/2005 | Roy et al. | |
| 7,718,319 B2 | 5/2010 | Manthiram et al. | |
| 7,846,588 B2 | 12/2010 | Jung et al. | |
| 8,148,011 B2 | 4/2012 | Thackeray et al. | |
| 8,277,683 B2 | 10/2012 | Deng et al. | |
| 8,465,877 B2 | 6/2013 | Hase et al. | |
| 8,663,849 B2 | 3/2014 | Venkatachalam et al. | |
| 8,673,505 B2 | 3/2014 | Ohzuku et al. | |
| 9,196,901 B2 | 11/2015 | Se-Hee et al. | |
| 9,437,902 B2 | 9/2016 | Onizuka | |
| 9,461,349 B2 | 10/2016 | Mizuno et al. | |
| 9,537,179 B2 | 1/2017 | Bhavaraju et al. | |
| 9,755,270 B2 | 9/2017 | Kim et al. | |
| 9,806,380 B2 | 10/2017 | Kumar et al. | |
| 9,893,383 B2 | 2/2018 | Raub et al. | |
| 9,911,981 B1 | 3/2018 | Kane | |
| 9,991,981 B2 | 6/2018 | Bunte et al. | |
| 11,165,093 B2* | 11/2021 | Kim | H01M 4/388 |
| 11,316,199 B2* | 4/2022 | Kim | H01M 10/0569 |
| 11,329,320 B2 | 5/2022 | Kubo et al. | |
| 11,335,908 B2* | 5/2022 | Kim | H01M 4/582 |
| 2002/0122973 A1 | 9/2002 | Manev et al. | |
| 2003/0157409 A1* | 8/2003 | Huang | H01M 10/052 429/231.95 |
| 2004/0009390 A1 | 1/2004 | Roy et al. | |
| 2007/0231705 A1 | 10/2007 | Ohzuku et al. | |
| 2008/0226977 A1 | 9/2008 | Kim et al. | |
| 2009/0053594 A1 | 2/2009 | Johnson et al. | |
| 2009/0061315 A1 | 3/2009 | Nakano et al. | |

(Continued)

FOREIGN PATENT DOCUMENTS

| | | |
|---|---|---|
| CN | 101267046 A | 9/2008 |
| CN | 101567472 A | 10/2009 |

(Continued)

OTHER PUBLICATIONS

International Search Report and Written Opinion dated Sep. 6, 2021, for counterpart PCT Application No. PCT/IB2021/054363, filed on May 20, 2021.
Kim et al., Reduced Graphene Oxide/LiI Composite Lithium Ion Battery Cathodes, Nano Letters 17:6893-6899 (2017).
Placke et al., Boosting Aqueous Batteries by Conversion-Intercalation Graphite Cathode Chemistry, Joule 3:1180-1189 (2019).
Cabana et al., Beyond Intercalation-Based Li-Ion Batteries: The State of the Art and Challenges of Electrode Materials Reacting Through Conversion Reactions, Advanced Energy Materials 22:E170-E192 (2010).

(Continued)

*Primary Examiner* — Laura Weiner
(74) *Attorney, Agent, or Firm* — Jeffrey M. Ingalls

(57) ABSTRACT

A metal halide battery includes an intercalation anode, a cathode that includes a metal halide incorporated into an electrically conductive material, an oxidizing gas, and an electrolyte in contact with the intercalation anode, the cathode, and the oxidizing gas. The battery has a cycle life reaching 1000 cycles at a current density that enables the battery to charge within 10-15 minutes. Electrolytes that may be used in the metal halide batteries include (i) carbonate ester-based compounds with at least one ethyl group and an ion-conducting salt and/or (ii) at least one cyclic ester compound.

14 Claims, 12 Drawing Sheets

(56) References Cited

U.S. PATENT DOCUMENTS

| | | |
|---|---|---|
| 2009/0311567 A1 | 12/2009 | Visco et al. |
| 2010/0273066 A1 | 10/2010 | Flanagan et al. |
| 2012/0270116 A1 | 10/2012 | Cho et al. |
| 2012/0321911 A1 | 12/2012 | Watanabe et al. |
| 2013/0089795 A1 | 4/2013 | Chase et al. |
| 2013/0130131 A1 | 5/2013 | Johnson et al. |
| 2013/0137001 A1 | 5/2013 | Zhang et al. |
| 2013/0224535 A1 | 8/2013 | Matsuoka et al. |
| 2013/0280624 A1 | 10/2013 | Lohmann et al. |
| 2014/0030596 A1 | 1/2014 | Wu et al. |
| 2014/0065456 A1 | 3/2014 | Bhavaraju et al. |
| 2014/0138591 A1 | 5/2014 | Yoon et al. |
| 2014/0234701 A1 | 8/2014 | Tanaka et al. |
| 2014/0255802 A1 | 9/2014 | Barde et al. |
| 2014/0322597 A1 | 10/2014 | Zhang et al. |
| 2014/0329151 A1 | 11/2014 | Onizuka et al. |
| 2015/0147673 A1 | 5/2015 | Li et al. |
| 2015/0236343 A1 | 8/2015 | Xiao et al. |
| 2015/0263379 A1 | 9/2015 | Xiao et al. |
| 2015/0280296 A1 | 10/2015 | Kang et al. |
| 2015/0325882 A1* | 11/2015 | Yushin ............... H01M 10/0568 429/188 |
| 2015/0325883 A1 | 11/2015 | Matsui et al. |
| 2016/0028121 A1 | 1/2016 | Stauffer |
| 2016/0186334 A1 | 6/2016 | Murahara |
| 2016/0248115 A1 | 8/2016 | Hatta et al. |
| 2016/0315345 A1 | 10/2016 | Kim et al. |
| 2017/0033350 A1 | 2/2017 | Mizuno et al. |
| 2017/0179557 A1 | 6/2017 | Sun et al. |
| 2017/0207475 A1 | 7/2017 | Ito |
| 2017/0222290 A1 | 8/2017 | Kang et al. |
| 2017/0250404 A1 | 8/2017 | Cho |
| 2017/0352936 A1 | 12/2017 | Jin |
| 2018/0183122 A1 | 6/2018 | Grey et al. |
| 2019/0122155 A1 | 4/2019 | Irazabal et al. |
| 2019/0221887 A1* | 7/2019 | Kim .................... H01M 4/38 |
| 2020/0161709 A1 | 5/2020 | Kubo et al. |
| 2020/0287233 A1 | 9/2020 | Kim et al. |
| 2021/0257702 A1 | 8/2021 | Sugimori et al. |

FOREIGN PATENT DOCUMENTS

| | | |
|---|---|---|
| CN | 104916810 A | 9/2015 |
| CN | 105579125 A | 5/2016 |
| CN | 105849967 * | 8/2016 |
| CN | 106207191 A | 12/2016 |
| CN | 106207264 A | 12/2016 |
| CN | 109950550 A | 6/2019 |
| CN | 111600020 A | 8/2020 |
| CN | 111602277 A | 8/2020 |
| DE | 112020001130 T5 | 12/2021 |
| EP | 3740987 A1 | 11/2020 |
| GB | 2596465 B | 9/2023 |
| IN | 496832 B | 1/2024 |
| JP | S6037661 A | 2/1985 |
| JP | 60-146464 A | 8/1985 |
| JP | 61-010882 A | 1/1986 |
| JP | H02-114466 A | 4/1990 |
| JP | 06-293991 A | 10/1994 |
| JP | 10-064540 A | 3/1998 |
| JP | 2004-303437 A | 10/2004 |
| JP | 2006-019274 A | 1/2006 |
| JP | 2007-273405 A | 10/2007 |
| JP | 2009-064584 A | 3/2009 |
| JP | 2009-170400 A | 7/2009 |
| JP | 2010-170867 A | 8/2010 |
| JP | 2011-222473 A | 11/2011 |
| JP | 2012-527740 A | 11/2012 |
| JP | 2013-084547 A | 5/2013 |
| JP | 2014-011105 A | 1/2014 |
| JP | 5668913 B2 | 2/2015 |
| JP | 2015-099849 A | 5/2015 |
| JP | 2016-540358 A | 12/2016 |
| JP | 2017-514278 A | 6/2017 |
| JP | 2018-525779 A | 9/2018 |
| JP | 2020-537780 A | 12/2020 |
| JP | 2022-522657 A | 4/2022 |
| JP | 7216734 B2 | 2/2023 |
| KR | 10-2405976 B1 | 6/2022 |
| KR | 2020-0078551 A | 6/2022 |
| WO | 2010/005686 A2 | 1/2010 |
| WO | 2011/154692 A1 | 12/2011 |
| WO | 2015/088065 A1 | 6/2015 |
| WO | 2016/014630 A1 | 1/2016 |
| WO | 2017/013379 A1 | 1/2017 |
| WO | 2017/149204 A2 | 9/2017 |
| WO | 2018/225434 A1 | 12/2018 |
| WO | 2019/142060 A1 | 7/2019 |
| WO | 2020018731 A1 | 1/2020 |
| WO | 2020/183282 A1 | 9/2020 |
| WO | 2021/019320 A1 | 2/2021 |

OTHER PUBLICATIONS

Etacheri et al., Challenges in the development of advanced Li-ion batteries: a review, Energy & Environmental Science 4:3243-3262 (2011).

Goriparti et al., Review on recent progress of nanostructured anode materials for Li-ion batteries, Journal of Power Sources 257:421-443 (2014).

Heller et al., Potentially implantable miniature batteries, Annals of Bioanalytical Chemistry 385:469-473 (2006).

Karden et al., Energy storage devices for future hybrid electric vehicles, Journal of Power Sources 168:2-11 (2007).

Komaba et al., Influence of manganese(II), cobalt(II), and nickel(II) additives in electrolyte on performance of graphite anode for lithium-ion batteries, Electrochimica Acta 47:1229-1239 (2002).

Lu et al., A rechargeable iodine-carbon battery that exploits ion intercalation and iodine redox chemistry, Nature Communications 8(1):1-10 (2017).

Nitta et al., Li-ion battery materials: present and future, Materials Today 18(5):252-264 (2015).

Puthusseri et al., Conversion-type Anode Materials for Alkali-Ion Batteries: State of the Art and Possible Research Directions, ACS Omega 3:4591-4601 (2018).

Shanmukaraj et al., Review-Towards Efficient Energy Storage Materials: Lithium Intercalation/Organic Electrodes to Polymer Electrolytes—A Road Map (Tribute to Michel Armand), Journal of the Electrochemical Society 167 (070530):1-11 (2020).

Tarascon et al., Issues and challenges facing rechargeable lithium batteries, Nature 414:359-367 (2001).

Wang et al., Rechargeable lithium/iodine battery with superior high-rate capability by using iodine-carbon composite as cathode, Energy & Environmental Science 4:3947-3950 (2011).

Xu et al., Nonaqueous Liquid Electrolytes for Lithium-Based Rechargeable Batteries, Chemical Review 104:4303-4417 (2004).

Kornthauer (Ed.), Lithium-Ion Batteries: Basics and Applications, Springer-Verlag GmbH Germany, Springer Nature 2018 (corrected publication 2019) (Translation of the German book Korthauer: Handbuch Lithium-Ionen-Batterien, Springer 2013).

Yang et al., Aqueous Li-ion battery enabled by halogen conversion-intercalation chemistry in graphite, Nature 569 (7755):245-263 (2019).

Intellectual Property Office, "Request for the Submission of an Opinion," Dec. 10, 2024, 20 Pages, KR Application No. 10-2023-7000121.

Japanese Patent Office, "Notice of Reasons for Refusal," Dec. 10, 2024, 10 Pages, JP Application No. 2023-501604.

Julien et al. "Electrolytes and Separators for Lithium Batteries", Lithium Batteries, Springer International Publishing, 2016. p. 433-437.

Bruce et al., Li—O2 and Li—S Batteries with High Energy Storage, Nature Materials 11, Dec. 15, 2011, 19-29 pp.

Bryantsev et al., The Identification of Stable Solvents for Nonaqueous Rechargeable Li-Air Batteries, Journal of The Electrochemical Society, Nov. 21, 2012, A160-A171 pp., vol. 160, Issue 1.

(56) References Cited

OTHER PUBLICATIONS

European Patent Office, "Supplementary European Search Report," Mar. 24, 2021, 7 Pages, EP Application 19741572.2.

Girishkumar et al., "Lithium-Air Battery: Promise and Challenges", The Journal of Physical Chemistry Letters, Jul. 2, 2010, vol. 1, Issue 14, 2193-2203 pp.

Indian Patent Office, "First Indian Examination Report", Apr. 13, 2023, 8 pages, Indian Application No. 202347002018.

Intellectual Property Office, Patents Act 1977: Search Report under Section 18(3), Jul. 9, 2024, 3 Pages, GB Application No. 2301706.4.

Intellectual Property Office, "Examination Report", Sep. 8, 2022, 4 pages, GB Application No. GB2113517.3.

International Searching Authority, "Notification of Transmittal of the International Search Report and the Written Opinion of the International Searching Authority," Patent Cooperation Treaty, Apr. 17, 2019, # 8 pages, International Application No. PCT/IB2019/050094.

International Searching Authority, "Notification of Transmittal of the International Search Report and the Written Opinion of the International Searching Authority," Patent Cooperation Treaty, May 28, 2020, # 9 pages, International Application No. PCT/IB2020/051752.

International Searching Authority, "Notification of Transmittal of the International Search Report and the Written Opinion of the International Searching Authority," Patent Cooperation Treaty, Sep. 29, 2020, # 9 pages, International Application No. PCT/IB2020/055606.

Japanese Patent Office, "Notice of Reasons for Refusal", Jul. 11, 2023, 7 pages, JP Application No. JP2021549404.

Japanese Patent Office, "Notice of Reasons for Refusal", May 12, 2022, 4 pages, JP Application No. JP2020537780.

Korean Intellectual Property Office, "Office Action", Feb. 24, 2022, 8 pages, KR Application No. 2020-7014367.

Li et al., "Li—O2 Cell with LiI(3-hydroxypropionitrile)2 as a Redox Mediator: Insight into the Working Mechanism of I-during Charge in Anhydrous Systems", The Journal of Physical Chemistry Letters, Sep. 7, 2017, 4218-4225 pp.

Lin et al., "Green Energy Materials Handbook", Retrieved from https://doi.org/10.1201/9780429466281, Jun. 21, 2019, 97 pages.

Liu et al., "Cycling Li—O2 Batteries via Lioh Formation And Decomposition", Science, Oct. 30, 2015, 530-533 pp., vol. 350, Issue 6260.

List of IBM Patents or Patent Applications Treated as Related, filed on Oct. 21, 2024, pp. 1-2.

McCloskey et al., "Solvents' Critical Role in Nonaqueous Lithium-Oxygen Battery Electrochemistry", The Journal of Physical Chemistry Letters, Apr. 27, 2011, 1161-1166 pp., vol. 2, Issue 10.

Meethong et al., "Strain Accommodation during Phase Transformations in Olivine-Based Cathodes as a Materials Selection Criterion for High-Power Rechargeable Batteries", Advanced Functional Materials, Mar. 21, 2007, 1115-1123 pp., vol. 17, Issue 7.

Olsen et al., "Dissolution of Platinum in Methoxy Propionitrile Containing Lii/l{Sub2}", Journal of Solar Energy Materials and Solar Cells; Jul. 30, 2000, 267-273 pp., vol. 63, Issue 3.

Peng et al., "A Reversible and Higher-Rate Li—O2 Battery", Science, Jul. 19, 2012, 563-566 pp., vol. 337, Issue 6094.

Perathoner, et al., "Advanced Nanocarbon Materials for Future Energy Applications", Emerging Materials for Energy Conversions and Storage, 2018, 305-3297 pp., Chapter 91.

Sygkridou et al., "Functional Transparent Quasi-Solid State Dye-Sensitized Solar Cells Made With Different Oligomer Organic/Inorganic Hybrid Electrolytes", Solar Energy Materials and Solar Cells, Jan. 2017, 600-607pp., vol. 159.

Takechi et al., "Stability of Solvents Against Superoxide Radical Species for The Electrolyte of Lithium-Air Battery", ECS Electrochemistry Letters, Jul. 17, 2012, A27-A29 pp.

Takemoto et al., "Development of Rechargeable Lithium-Bromine Batteries With Lithium Ion Conducting Solid Electrolyte", Journal of Power Sources, May 1, 2015, 334-340 pp., vol. 281.

The State Intellectual Property Office of People's Republic of China, "First Chinese Office Action", Sep. 28, 2022, 8 pages, Chinese Application No. 201980008474.1.

The State Intellectual Property Office of People's Republic of China, "Notification to Grant", Jul. 15, 2024, 4 pages, CN Application No. 202080018029.6.

The State Intellectual Property Office of People's Republic of China, "Second Chinese Office Action", Feb. 2, 2024, 14 pages, Chinese Application No. 202080018029.6.

The State Intellectual Property Office of People's Republic of China, "Second Chinese Office Action", Mar. 14, 2023, 3 pages, Chinese Application No. 201980008474.1.

United States Patent and Trademark Office, "Office Actions and Responses", Jul. 19, 2021, 128 pages, U.S. Appl. No. 15/872,607.

Wang et al., "Fixing of High Soluble Br2/Br—In Porous Carbon as Cathode Material for Rechargeable Lithium Ion Batteries", Journal of Materials Chemistry A, 2015, 5 pages, Issue 5, available at DOI: 10.1039/x0xx00000x.

Whittingham et al., "Lithium Batteries and Cathode Materials", American Chemical Society, Sep. 14, 2004, 4271-4301 pp., vol. 104, Issue 10.

Wu et al., "LiI Embedded Meso-Micro Porous Carbon Polyhedrons for Lithium Iodine Battery With Superior Lithium Storage Properties", Energy Storage Materials, 2018, 62-68 pp., vol. 10.

Xu et al., "Lithium Metal Anodes for Rechargeable Batteries", Energy & Environmental Science, 2014, 513-537 pp., Issue 2.

Zhao et al., "High-Performance Rechargeable Lithium-Iodine Batteries Using Triiodide/Iodide Redox Couples in an Aqueous Cathode", Nature Communications, May 13, 2013, 7 pages vol. 4, Article-1896, https://doi.org/10.1038/ncomms2907.

Zhao et al., "A 3.5 V Lithium-Iodine Hybrid Redox Battery with Vertically Aligned Carbon Nanotube Current Collector", Nano Letters, 2017, 1085-1092 pp., vol. 14.

Zhu et al., "Proton enhanced dynamic battery chemistry for aprotic lithium-oxygen batteries", Nature Communications, pp. 1-8, vol. 8, Article-14308, 2017, (DOI: 10.1038/ncomms14308; www.nature.com/naturecommunications).

Japanese Patent Office "Japanese Notice of Allowance" Jan. 1, 2023, 3 pages, JP Application No. JP2020537780.

Japanese Patent Office "Japanese Receive Rejection" Dec. 12, 2023, 2 pages, JP Application No. JP2021-549404.

German Patent and Trademark Office, " Office Action," Feb. 10, 2025, 08 Pages, DE Application No. 112020002995.6.

* cited by examiner

RECHARGEABLE METAL HALIDE BATTERY WITH INTERCALATION ANODE

TECHNICAL FIELD

The present invention relates generally to rechargeable metal halide batteries and, more specifically, to a rechargeable metal halide battery with an intercalation anode, an oxidizing gas, and an electrolyte that includes (1) a cyclic or non-cyclic carbonate ester-based compound and an ion-conducting salt and/or (2) at least one cyclic ester compound.

BACKGROUND OF THE INVENTION

Rechargeable batteries are in high demand for a wide range of applications, from small batteries for industrial and medical devices, to larger batteries for electric vehicles and grid energy storage systems. There are two types of rechargeable batteries currently in use: (i) batteries that run via electrochemical intercalation/de-intercalation behavior of acting ions and (ii) batteries that run via conversion reaction of active electrode/electrolyte materials. The most well-known and widely used rechargeable batteries are the lithium-ion batteries, which use an intercalated lithium compound as one electrode material and have the lithium ion move back and forth through a liquid electrolyte. Lithium-ion batteries suffer from shortcomings such as slow charging/discharging rates and the high cost of cathode materials that need to be overcome in order to meet the high standard of demand in the market. Cathode materials, such as lithium nickel manganese cobalt oxide (NMC), lithium nickel cobalt aluminum oxide (NCA), lithium cobalt oxide (LCO), and lithium iron phosphate (LFP), prohibit lithium-ion batteries from moving into a wider range of applications. Lithium metal has been widely considered as the preferred active anode material due to its high theoretical energy density; however, issues with lithium metal, such as dendrite growth, which result in the cell short circuiting, has prevented lithium-ion batteries from being widely commercialized.

SUMMARY OF THE INVENTION

The present invention overcomes the need in the art with a rechargeable metal halide battery comprising an intercalation anode, an oxidizing gas, and an electrolyte that may include (1) a cyclic or non-cyclic carbonate ester-based compound and an ion-conducting salt, and/or (2) at least one cyclic ester compound.

In one embodiment, the present invention relates to a battery comprising: an intercalation anode; a cathode comprising a metal halide incorporated into an electrically conductive material, an oxidizing gas, and an electrolyte in contact with the intercalation anode, the cathode, and the oxidizing gas.

In another embodiment, the present invention relates to a battery, comprising: an intercalation anode; a cathode comprising a metal halide incorporated into an electrically conductive material, an oxidizing gas, and an electrolyte comprising (i) a cyclic or non-cyclic carbonate ester-based compound; and (ii) an ion-conducting salt comprising a metal cation $[M]^+$ and an anion $[X]^-$ having a chemical formula of $[M]^+[X]^-$, wherein the electrolyte is in contact with the intercalation anode, the cathode, and the oxidizing gas.

In a further embodiment, the present invention relates to a battery, comprising: an intercalation anode; a cathode comprising a metal halide incorporated into an electrically conductive material, an oxidizing gas, and an electrolyte comprising at least one cyclic ester compound, wherein the electrolyte is in contact with the intercalation anode, the cathode, and the oxidizing gas.

In one aspect, the present invention relates to a method of forming a battery comprising: forming a battery stack comprising an intercalation anode, a metal halide cathode in an electrically conductive material, a separator positioned between the intercalation anode and the electrically conductive material of the metal halide cathode, and an electrolyte comprising (i) a cyclic or non-cyclic carbonate ester-based compound and (ii) an ion-conducting salt comprising a metal cation $[M]^+$ and an anion $[X]^-$ having a chemical formula of $[M]^+[X]^-$, wherein an oxidizing gas is introduced into the battery stack and the electrolyte is in contact with the intercalation anode, the metal halide cathode, and the oxidizing gas.

In another aspect, the present invention relates to a method of forming a battery comprising: forming a battery stack comprising an intercalation anode, a metal halide cathode in an electrically conductive material, a separator positioned between the intercalation anode and the electrically conductive material of the metal halide cathode, and an electrolyte comprising at least one cyclic ester compound, wherein an oxidizing gas is introduced into the battery stack and the electrolyte is in contact with the intercalation anode, the metal halide cathode, and the oxidizing gas.

In other embodiments and aspects, the cyclic or non-cyclic carbonate ester-based compound includes at least one pendant ethyl group. In further embodiments and aspects, the cyclic or non-cyclic carbonate ester-based compound includes at least two pendant ethyl groups.

In further embodiments and aspects, the carbonate ester-based compound is selected from the group consisting of ethylene carbonate (EC), vinylene carbonate (VC), propylene carbonate (PC), diethyl carbonate (DEC), dipropyl carbonate (DPC), dibutyl carbonate (DBC), dimethyl carbonate (DMC), ethyl methyl carbonate (EMC), ethyl propyl carbonate (EPC), ethyl butyl carbonate (EBC), ethyl salicylate carbonate (ESC), fluoroethylene carbonate (FEC), allyl methyl carbonate (AMC), dodecyl ethyl carbonate (DDEC), diethyl dicarbonate (DEDC), and combinations thereof.

In other embodiments and aspects, the metal cation $[M]^+$ is selected from the group consisting of $Li^+$, $Mg^{2+}$, $Zn^{2+}$, $Al^{3+}$, $Na^+$, and combinations thereof.

In further embodiments and aspects, the anion $[X]^-$ is selected from the group consisting of nitrate ($NO_3^-$), hexafluorophosphate ($PF_6^-$), tetrafluoroborate ($BF_4^-$), bisoxalato borate ($BOB^-$), difluorooxalato borate ($DFOB^-$), trifluoromethanesulfonate ($TF^-$), trifluoromethanesulfonylimide ($TFSI^-$), fluorosulfonylimide ($FSI^-$), and combinations thereof.

In other embodiments and aspects, the at least one cyclic ester compound is an additive to the carbonate ester-based electrolyte.

In further embodiments and aspects, the at least one cyclic ester compound has a weight percent concentration in the electrolyte between 5% and 20%.

In other embodiments and aspects, the at least one cyclic ester compound is selected from the group consisting of beta-propiolactone (BPL), beta-butyrolactone (BBL), alpha-methyl-gamma-butyrolactone (AMGBL), gamma-butyrolactone (BPL), gamma-valerolactone (GVL), delta-valerolactone (DVL), gamma-caprolactone (GCL), epsilon-caprolactone (ECL), gamma-octanolactone (GOL), gamma-nanolactone (GNL), gamma-decanolactone (GDL), delta-decanolactone (DDL), gamma-undecanolactone (GUL), delta-undecanolactone (DuL), delta-dodecanolactone (DDDL), and combinations thereof.

In further embodiments and aspects, the at least one cyclic ester compound is gamma-butyrolactone (GBL) and/or epsilon-caprolactone (ECL).

In other embodiments and aspects, the intercalation anode is selected from the group consisting of graphite, graphene, reduced graphene oxide (RGO), silicon, silicon alloys, silicon-carbon composites, carbon nanotubes, fullerenes, titanium dioxide ($TiO_2$), titanium disulfide ($TiS_2$), molybdenum dioxide ($MoO_2$), molybdenum trioxide ($MoO_3$), molybdenum disulfide ($MoS_2$), and combinations thereof.

In further embodiments and aspects, the intercalation anode comprises graphite.

In other embodiments and aspects, the metal halide of the cathode comprises (i) a metal ion selected from the group consisting of $Li^+$, $Mg^+$, $Zn^+$, $Al^+$, $Na^+$, and combinations thereof; and (ii) a halide ion selected from the group consisting of $I^-$, $Br^-$, $Cl^-$, $F^-$, and combinations thereof.

In further embodiments and aspects, the cathode is a conversion cathode selected from the group consisting of: lithium iodide (LiI), lithium chloride (LiCl), lithium bromide (LiBr), lithium fluoride (LF), sodium chloride (NaCl), sodium iodide ($NaI_2$), nickel chloride ($NiCl_2$), zinc bromide ($ZnBr_2$), zinc chloride ($ZnCl_2$), and combinations thereof.

In other embodiments and aspects, the electrically conductive material is selected from the group consisting of carbon black, carbon paper, carbon foam, carbon fibers, carbon nanofibers, carbon nanotubes, activated carbon, amorphous carbon, graphite sheets, graphene, reduced graphene oxide, and combinations thereof.

In further embodiments and aspects, the oxidizing gas is selected from the group consisting of oxygen, air, nitric oxide, nitrogen dioxide, and combinations thereof.

Additional embodiments and/or aspects of the invention will be provided, without limitation, in the detailed description of the invention that is set forth below.

DETAILED DESCRIPTION OF THE INVENTION

Figure 1:
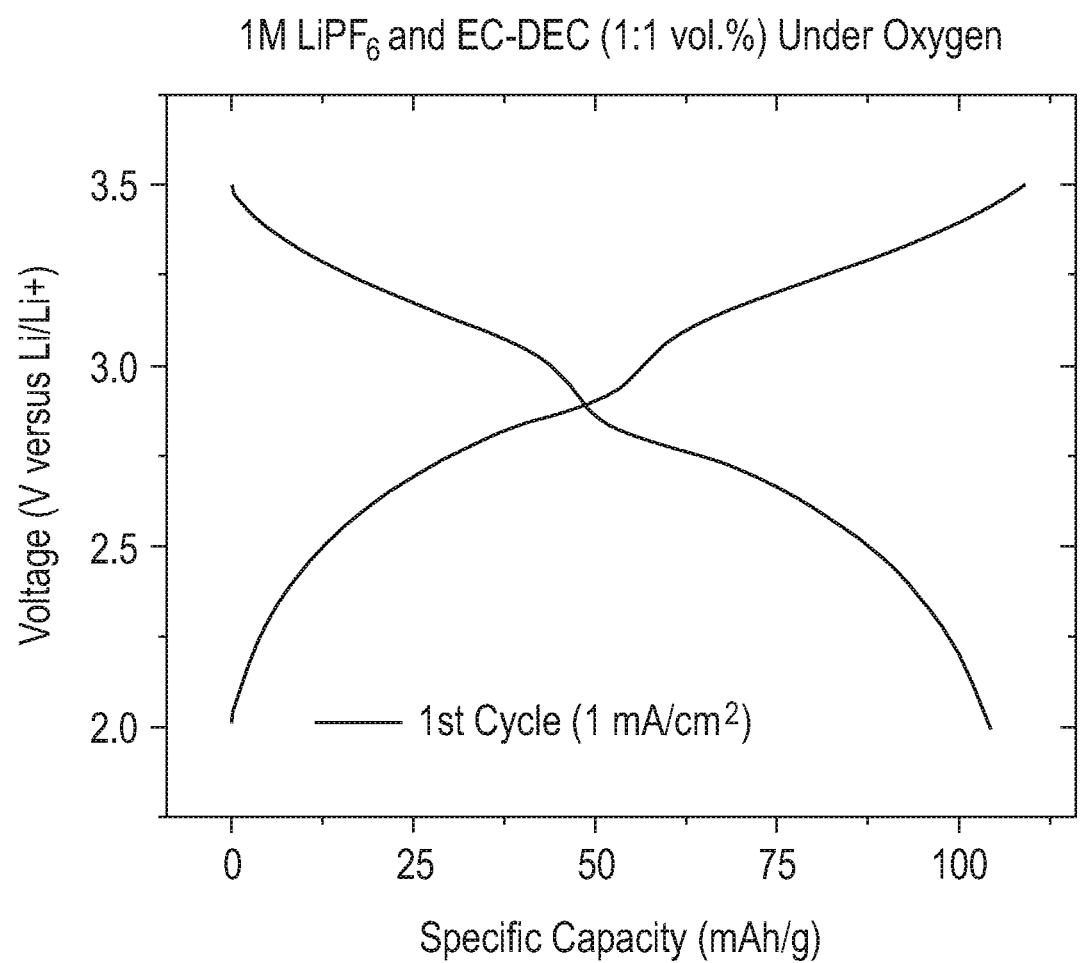
FIG. 1 is a performance profile graph for the first cycle of a rechargeable metal halide battery cell with a graphite anode, a lithium iodide (LiI) cathode, and an electrolyte solution of 1M lithium hexafluorophosphate ($LiPF_6$) dissolved in ethylene carbonate diethyl carbonate (EC-DEC) (1:1 vol. %) operated under oxygen at a current density of 1 mA/cm$^2$ (Example 1).

Set forth below is a description of what are currently believed to be preferred aspects and/or embodiments of the claimed invention. Any alternates or modifications in function, purpose, or structure are intended to be covered by the appended claims. As used in this specification and the appended claims, the singular forms "a," "an," and "the" include plural referents unless the context clearly dictates otherwise. The terms "comprise," "comprised," "comprises," and/or "comprising," as used in the specification and appended claims, specify the presence of the expressly recited components, elements, features, and/or steps, but do not preclude the presence or addition of one or more other components, elements, features, and/or steps.

As used herein, the term "metal halide" refers to a compound having a metal and a halogen. The metals of metal halides may be any metal in Groups 1 to 16 of the periodic chart but will typically be Group 1 alkali metals. The halides of the metal halides will be any halogen in Group 17 of the periodic chart.

As used herein, the term "cathode" refers to the positive electrode of a battery cell that receives electrons from an external circuit and is reduced during discharging, and transfers them to an external circuit through oxidation during charging. In a metal halide battery, the cathode material comprises a metal halide as defined above. Cathode materials appropriate for the rechargeable metal halide batteries may also be conversion-type cathode materials, which are electrode materials that undergo a conversion reaction according to Formula (1) or Formula (2):

$$2\ YZ \rightleftarrows Z_2 + 2Y^+ 2e^-, \quad (1)$$

$$YZ_2 \rightleftarrows Z_2 + Y^{2+} + 2e^- \quad (2)$$

where Y is an alkali metal (1) or an alkaline earth metal (2) and Z is a halogen, such as F, Cl, Br, and I. In the charging reaction of Formulas (1) and (2) (the forward reaction →), the conversion-type cathode materials having the chemical formulas YZ or $YZ_2$ release electrons to an external circuit to form $Z_2$. The excess metal ions, $Y^+$ or $Y^{2+}$, are released from the cathode, move toward the anode, and are reduced on the anode surface by receiving the electrons transferred through the external circuit during the charging process. In the discharging reaction of Formulas (1) and (2) (the reverse reaction ←), $Z_2$ receives electrons formed during the anode oxidation and transfers the electrons through an external circuit, forming $Z^-$. The reduced species, $Z^-$, ionically binds with $Y^+$ or $Y^{2+}$, which are diffused from the anode to the cathode to form the conversion-type cathode materials, YZ or $YZ_2$.

Unlike lithium-ion and nickel metal hydride (NiMH) batteries, metal halide batteries do not require heavy metal cathode materials (such as cobalt or nickel, respectively); thus, rechargeable metal halide batteries have potentially lower manufacturing costs than traditional lithium-ion or NiMH batteries. Further, because the rechargeable metal halide batteries do not require a lithium metal, the batteries also have a reduced risk of fire and are thus safer to run than rechargeable batteries used in the art that require lithium metal for operation.

As used herein, the term "anode" refers to the negative electrode of a battery cell that transfers electrons to an external circuit through oxidation during discharging, and receives them from an external circuit and is reduced during charging. Anode materials appropriate for the rechargeable metal halide batteries may be intercalation-type anode materials, which have a reaction mechanism between the metal ions of a metal halide cathode material (including the lithium of conversion-type cathode materials) and the anode material in an intercalation/de-intercalation process, wherein the metal ions are inserted into (during charging), and subsequently released from (during discharging), stable sites within or on the surface of the anode material. Exemplary intercalation-type anode materials will typically be lattice-type structures. Materials that may form such lattice-type structures include carbon allotropes, silicon compounds, titanium compounds, and molybdenum compounds.

As used herein, the term "electrolyte" refers to a material that provides for ion transport between the anode and cathode of a battery cell. An electrolyte acts as a conduit for ion transport through its interaction with the anode and the cathode. Upon battery charging, an electrolyte facilitates the movement of ions from the cathode to the anode, whereas upon discharge, the electrolyte facilitates the movement of ions from the anode to the cathode. In rechargeable batteries, the electrolyte promotes ion cycling between the anode and the cathode.

As used herein, the term "oxidizing gas" refers to a gas that induces a reduction-oxidation (redox) reaction in a battery cell. Examples of oxidizing gases include, without limitation, oxygen, air, nitric oxide, nitrogen dioxide, and combinations thereof. As is known to those of skill in the art, a redox reaction is a reaction that transfers electrons between (i) a reducing agent that undergoes oxidation through the loss of electrons and (ii) an oxidizing agent that undergoes reduction through the gain of electrons. Within the context of the present invention, the oxidizing gas works in concert with the electrolyte to form a stable SEI (solid-electrolyte interphase) layer on the surface of electrodes of a rechargeable metal halide battery, and promote the redox reaction of active cathode materials.

The rechargeable metal halide batteries described herein comprise an anode, a metal halide cathode, an oxidizing gas, and an electrolyte in contact with the anode, the cathode, and the oxidizing gas. The batteries are high powered, fast-charging, and electrically stable. The combination of battery components is capable of prolonging the cycle life of a metal halide battery by up to 1000 cycles at a current density that enables the battery to charge within 10-15 minutes (e.g., FIGS. 10-12, Examples 7-9).

In one embodiment, the metal halide cathode of the rechargeable metal halide battery may comprise (i) a metal ion selected from the group consisting of $Li^+$, $Mg^{2+}$, $Zn^{2+}$, $Al^{3+}$, $Na^+$, and combinations thereof; and (ii) a halogen ion selected from the group consisting of $I^-$, $Br^-$, $Cl^-$, $F^-$, and combinations thereof. Where the metal halide cathode is a conversion cathode, the conversion cathode material may include, without limitation, lithium iodide (LiI), lithium chloride (LiCl), lithium bromide (LBr), lithium fluoride (LF), sodium chloride (NaCl), sodium iodide ($NaI_2$), nickel chloride ($NiCl_2$), zinc bromide ($ZnBr_2$), zinc chloride ($ZnCl_2$), and combinations thereof.

In another embodiment, the anode of the rechargeable metal halide battery is an intercalation anode. Intercalation anode materials that may be used in the rechargeable metal halide battery include, without limitation, graphite, graphene, reduced graphene oxide (RGO), silicon, silicon alloys, silicon-carbon composites, carbon nanotubes, fullerenes, titanium dioxide ($CiO_2$), titanium disulfide ($TiS_2$), molybdenum dioxide ($MoO_2$), molybdenum trioxide ($MoO_3$), molybdenum disulfide ($MoS_2$), and combinations thereof.

In a further embodiment, the metal halide cathode may be incorporated into an electrically conductive material, such as a carbon current collector and/or porous carbon. Examples of electrically conductive materials that may be used to incorporate the cathode material include, without limitation, carbon black, carbon paper, carbon foam, carbon fibers, carbon nanofibers, carbon nanotubes, activated carbon, amorphous carbon, graphite sheets, graphene, reduced graphene oxide, and combinations thereof. Depending on the electrically conductive material used, the metal halide may be interspersed within the electrically conductive material or adsorbed onto the electrically conductive material. Where the electrically conductive material is a porous material, the metal halide may be incorporated into a plurality of pores of the porous material.

In another embodiment, the electrolyte for the rechargeable metal halide battery comprises a carbonate ester-based compound with at least one ethyl group. In a further embodiment, the electrolyte comprises a carbonate ester-based compound with at least two ethyl groups. Examples of such carbonate ester-based compounds that may be used for the battery electrolyte include, without limitation, ethylene carbonate (EC), vinylene carbonate (VC), propylene carbonate (PC), diethyl carbonate (DEC), dipropyl carbonate (DPC), dibutyl carbonate (DBC), dimethyl carbonate (DMC), ethyl methyl carbonate (EMC), ethyl propyl carbonate (EPC), ethyl butyl carbonate (EBC), ethyl salicylate carbonate (ESC), fluoroethylene carbonate (FEC), allyl methyl carbonate (AMC), dodecyl ethyl carbonate (DDEC), diethyl dicarbonate (DEDC), and combinations thereof.

In another embodiment, the electrolyte comprises an ion-conducting salt comprising a metal cation $[M]^+$ and an anion $[X]^-$ having a chemical formula of $[M]^+[X]^-$. Examples of metal cations that may comprise the ion-conducting salt of the electrolyte solution include, without limitation, $Li^+$, $Mg^{2+}$, $Zn^{2+}$, $Al^{3+}$, $Na^+$, and combinations thereof. Examples of anions that may comprise the ion-conducting salt include, without limitation, nitrate ($NO_3^-$), hexafluorophosphate ($PF_6^-$), tetrafluoroborate ($BF_4^-$), bisoxalato borate ($BOB^-$), difluorooxalato borate ($DFOB^-$), trifluoromethanesulfonate ($TF^-$), trifluoromethanesulfonylimide ($TFSI^-$), fluorosulfonylimide ($FSI^-$), and combinations thereof.

In a further embodiment, the electrolyte comprises at least one cyclic ester and/or lactone (cyclic carboxylic ester). The at least one cyclic ester and/or lactone is collectively referred to herein as "cyclic ester(s)." The cyclic ester may be used as an additive to the carbonate ester-based electrolyte. Examples of such cyclic esters include, without limitation, beta-propiolactone (BPL), beta-butyrolactone (BBL), alpha-methyl-gamma-butyrolactone (AMGBL), gamma-butyrolactone (GBL), gamma-valerolactone (GVL), delta-valerolactone (DVL), gamma-caprolactone (GCL), epsilon-caprolactone (ECL), gamma-octanolactone (GOL), gamma-nanolactone (GNL), gamma-decanolactone (GDL), delta-decanolactone (DDL), gamma-undecanolactone (GUL), delta-undecanolactone (DUL), delta-dodecanolactone (DDDL), and combinations thereof.

Rechargeable metal halide batteries manufactured with the components described herein may further include a separator between the anode and the cathode. In one embodiment, a battery stack is formed by placing a separator between the intercalation anode and the metal halide cathode. In a further embodiment, the battery stack is formed by placing the separator between the intercalation anode and the electrically conductive material, the latter of which incorporates the metal halide cathode. In another embodiment, an electrolyte solution as described herein is used to soak the separator prior to incorporation into the battery stack. In a further embodiment, the electrolyte solution is introduced into the battery stack either during or after formation of the stack. In another embodiment, an oxidizing gas is introduced into the battery stack. In operation, the metal halide battery is charged after introduction of the oxidizing gas to the battery stack. To return the battery to an idle state, the oxidizing gas may be removed by purging the battery with an inert gas. Examples of inert gases include, without limitation, argon (Ar), nitrogen (N), helium (He), neon (Ne), xenon (Xe), krypton (Kr), and combinations thereof.

The following discussion provides data derived from batteries operated with a graphite anode, a lithium iodide (LiI) cathode, electrolyte solutions comprising 1M lithium hexafluorophosphate ($LiPF_6$) as an ion-conducting salt dissolved in various different carbonate ester solutions (with and without cyclic ester additives), and oxygen as an oxidizing gas. It is to be understood that the graphite anode, the LiI cathode, the electrolyte solutions, and the oxygen are used as exemplary materials and are not meant to be limiting to the various different battery combinations as disclosed herein.

Figure 7:
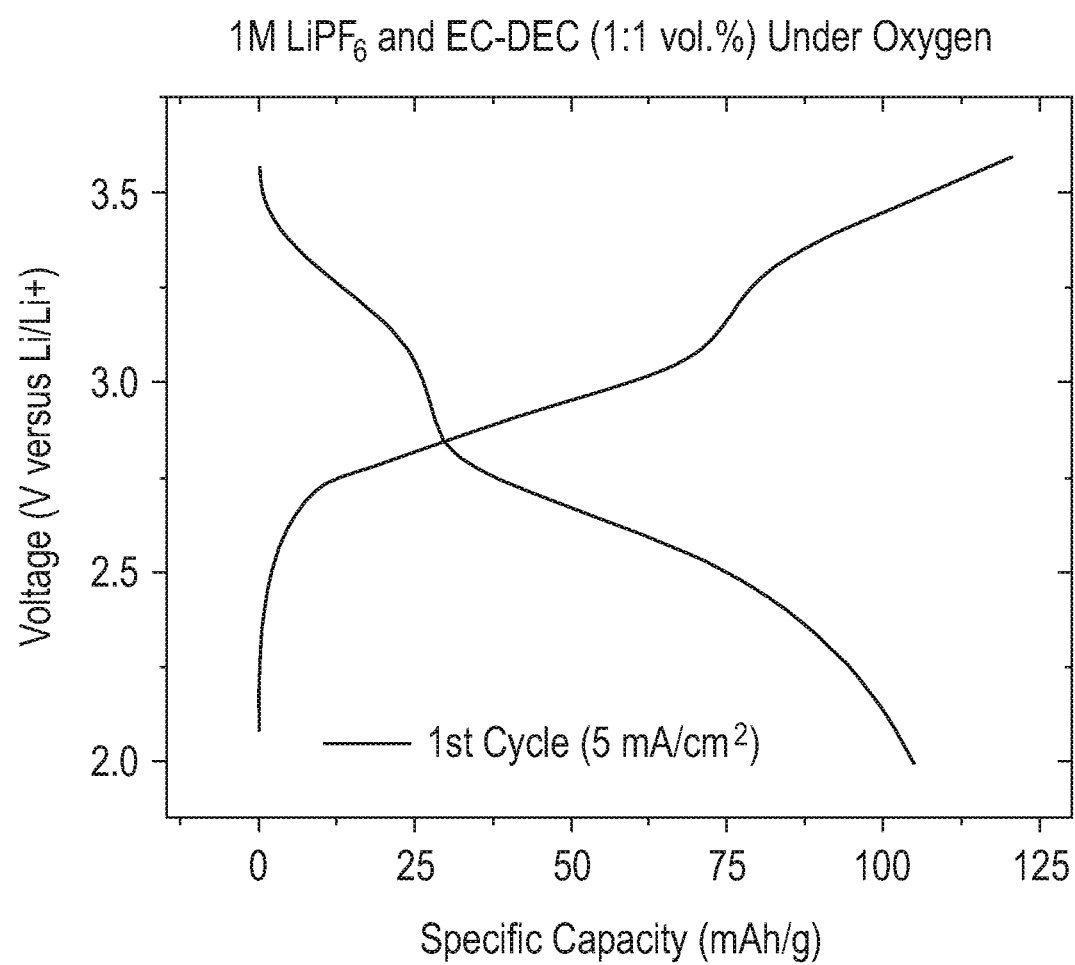
FIG. 7 is a performance profile graph for the first cycle of a rechargeable metal halide battery cell with a graphite anode, a LiI cathode, and an electrolyte solution of 1M $LiPF_6$ dissolved in EC-DEC (1:1 vol. %) operated under oxygen at a current density of 5 mA/cm$^2$ (Example 4).

FIG. 1 is a cycle performance graph showing the first charge/discharge cycle of a rechargeable metal halide battery comprising graphite as an anode material, LiI as an active cathode material, an electrolyte solution of 1M $LiPF_6$ dissolved in an organic solution of EC-DEC (1:1 vol. %), and oxygen as a catalyst (Example 1), run at a current density of 1 mA/cm$^2$. FIG. 7 shows the same battery from FIG. 1, but run at a current density of 5 mA/cm$^2$ (Example 4). In FIG. 1, the first cycle voltaic and coulombic efficiencies are both in excess of 95%, and the first cycle specific capacity for the battery is greater than 100 mAh/g, normalized by the amount of lithium iodide. FIG. 7 shows similar first cycle results as FIG. 1, with voltaic and coulombic efficiency both in excess of 85% and the specific capacity of the battery also greater than 100 mAh/g, normalized by the amount of lithium iodide.

Figure 2:
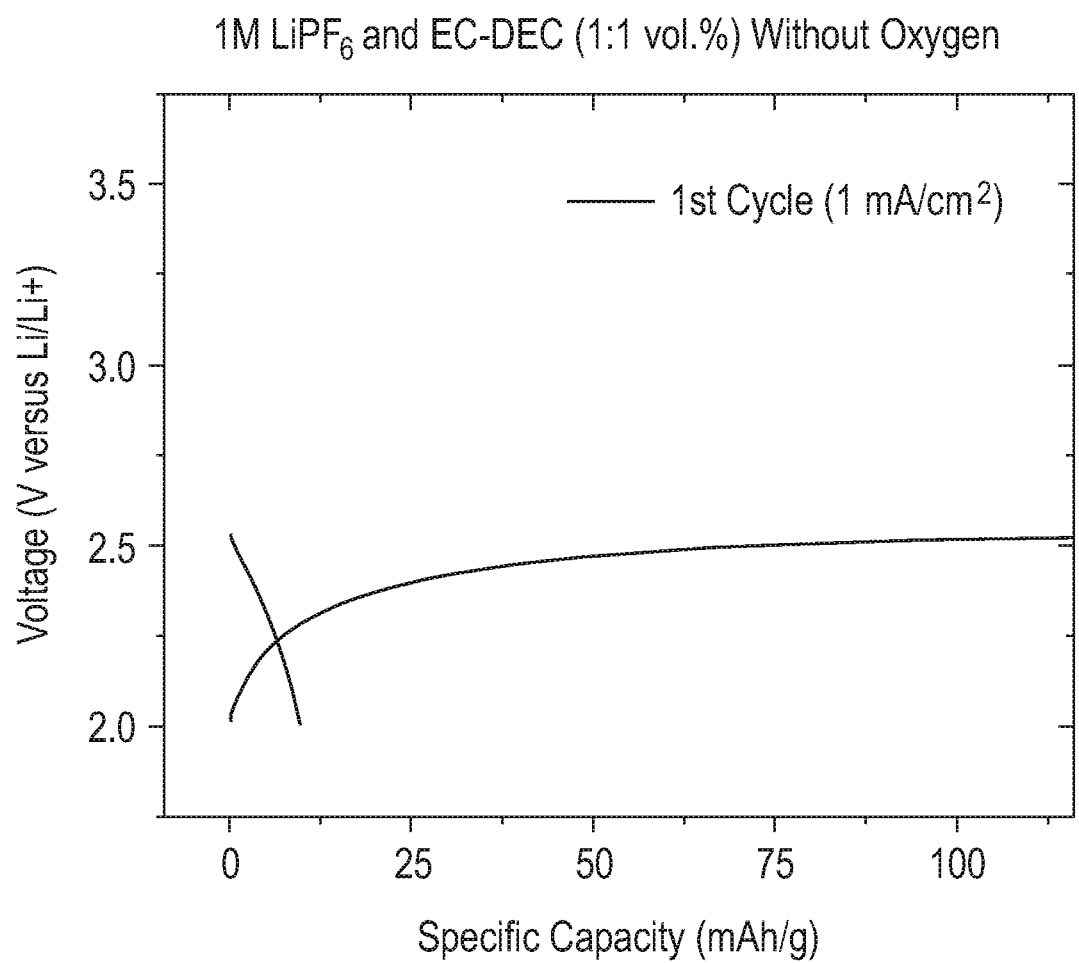
FIG. 2 is a performance profile graph for the first cycle of a rechargeable metal halide battery cell with a graphite anode, an UI cathode, and 1M $LiPF_6$ dissolved in EC-DEC electrolyte (1:1 vol. %) operated without oxygen under argon at a current density of 1 mA/cm$^2$ (Comparative Example 1).

FIG. 2 is a cycle performance graph showing the first charge/discharge cycle of a rechargeable metal halide battery comprising graphite as an anode material, LiI as an active cathode material, and an electrolyte solution of 1M $LiPF_6$ dissolved in EC-DEC (1:1 vol. %), run at a current density of 1 mA/cm$^2$, without oxygen as a catalyst (Comparative Example 1). The first cycle results of FIG. 2 show voltaic efficiency below 70%, coulombic efficiency below 10%, and specific capacity less than 10 mAh/g, normalized by the amount of lithium iodide. The omission of oxygen from the battery of FIG. 1 results in significantly reduced battery rechargeability and life span.

Figure 3:
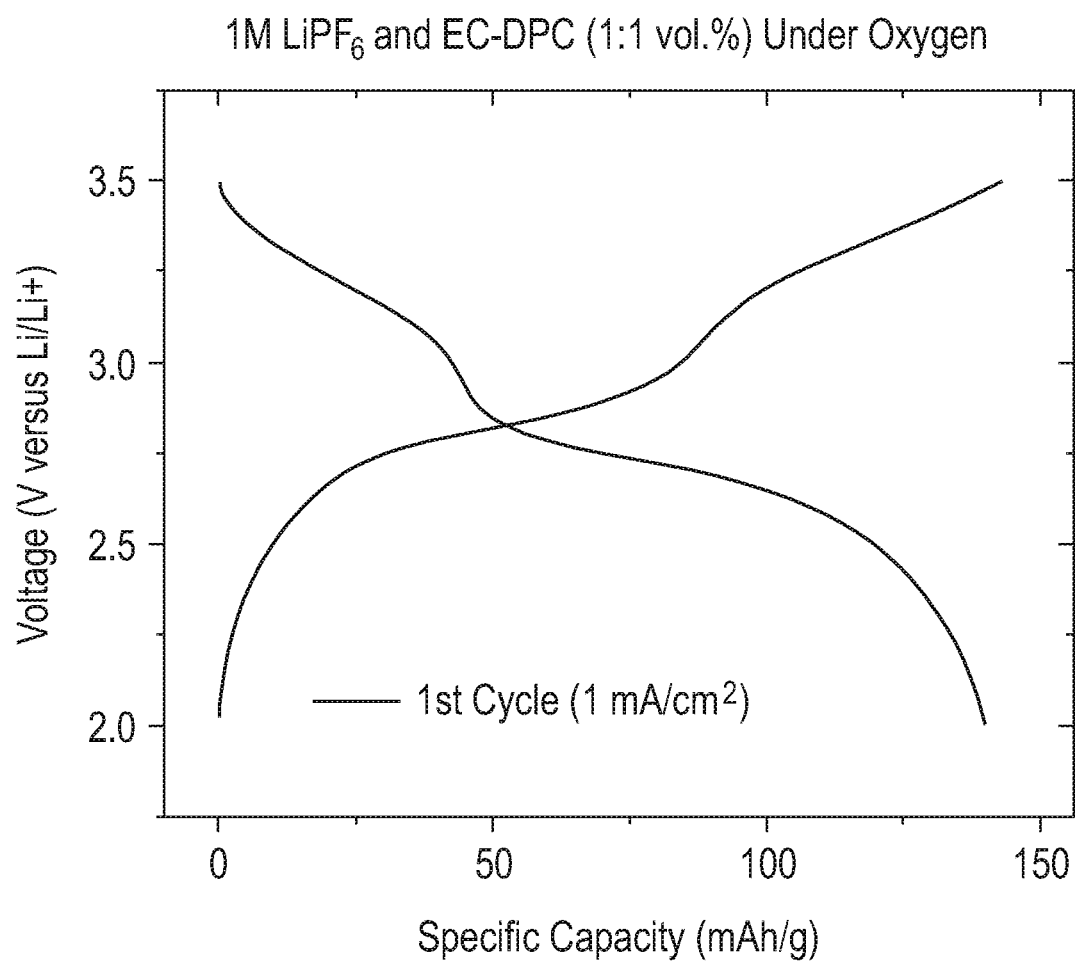
FIG. 3 is a performance profile graph for the first cycle of a rechargeable metal halide battery cell with a graphite anode, a LiI cathode, and an electrolyte solution of 1M $LiPF_6$ dissolved in ethylene carbonate dipropyl carbonate (EC-DPC) (1:1 vol. %) operated under oxygen at a current density of 1 mA/cm$^2$ (Example 2).

FIG. 3 is a cycle performance graph showing the first charge/discharge cycle of a rechargeable metal halide battery comprising graphite as an anode material, LiI as an active cathode material, an electrolyte solution of 1M $LiPF_6$ dissolved in EC-DPC (1:1 vol. %), and oxygen as a catalyst, run at a current density of 1 mA/cm$^2$ (Example 2). The first cycle results of FIG. 3 show voltaic efficiency and coulombic efficiency both in excess of 95% and specific capacity greater than 125 mAh/g, normalized by the amount of lithium iodide.

Figure 4:
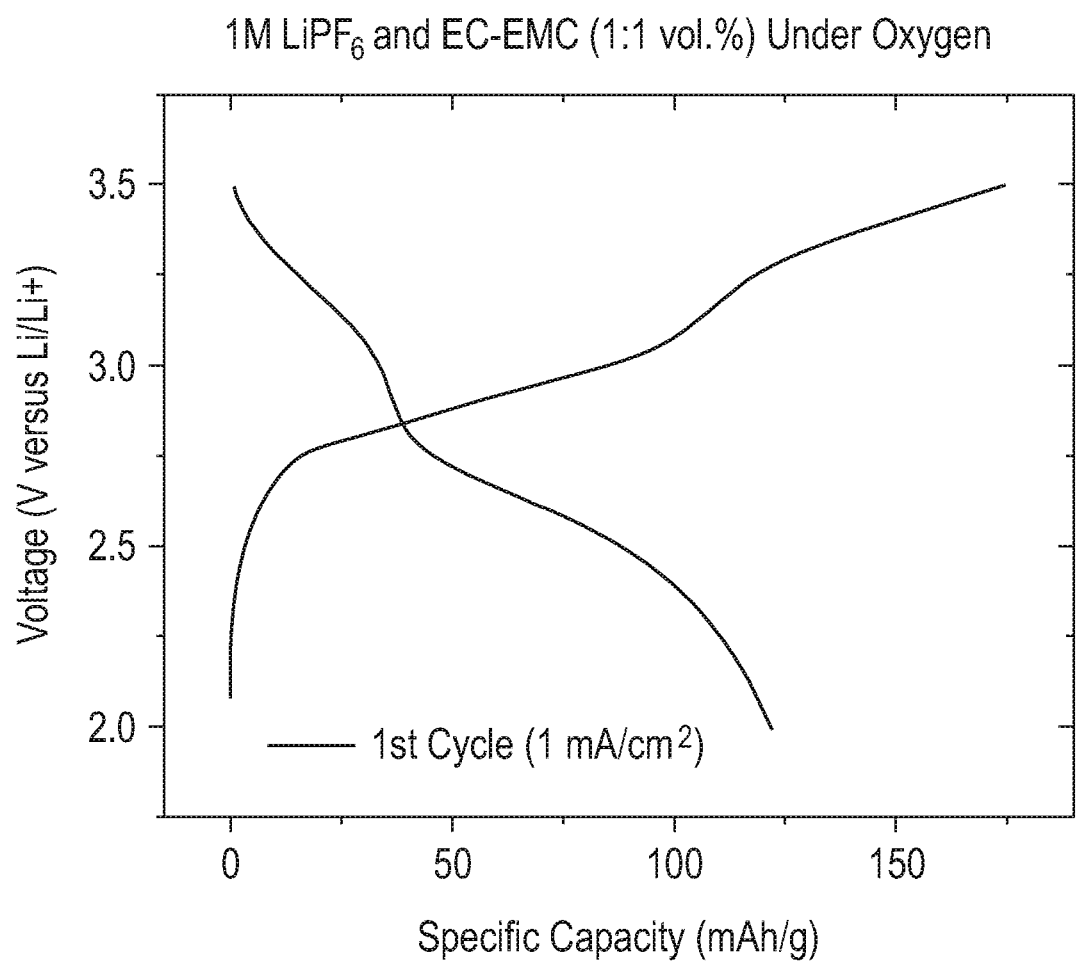
FIG. 4 is a performance profile graph for the first cycle of a rechargeable metal halide battery cell with a graphite anode, a LiI cathode, and an electrolyte solution of 1M $LiPF_6$ dissolved in ethylene carbonate ethyl methyl carbonate (EC-EMC) (1:1 vol. %) operated under oxygen at a current density of 1 mA/cm$^2$ (Example 3).

FIG. 4 is a cycle performance graph showing the first charge/discharge cycle of a rechargeable metal halide battery comprising graphite as an anode material, LiI as an active cathode material, an electrolyte solution of 1M $LiPF_6$ dissolved in EC-EMC (1:1 vol. %), and oxygen as a catalyst, run at a current density of 1 mA/cm$^2$ (Example 3). The first cycle results of FIG. 4 show voltaic efficiency was in excess of 80%, coulombic efficiency was excess of 60%, and specific capacity greater than 100 mAh/g, normalized by the amount of lithium iodide.

Figure 5:
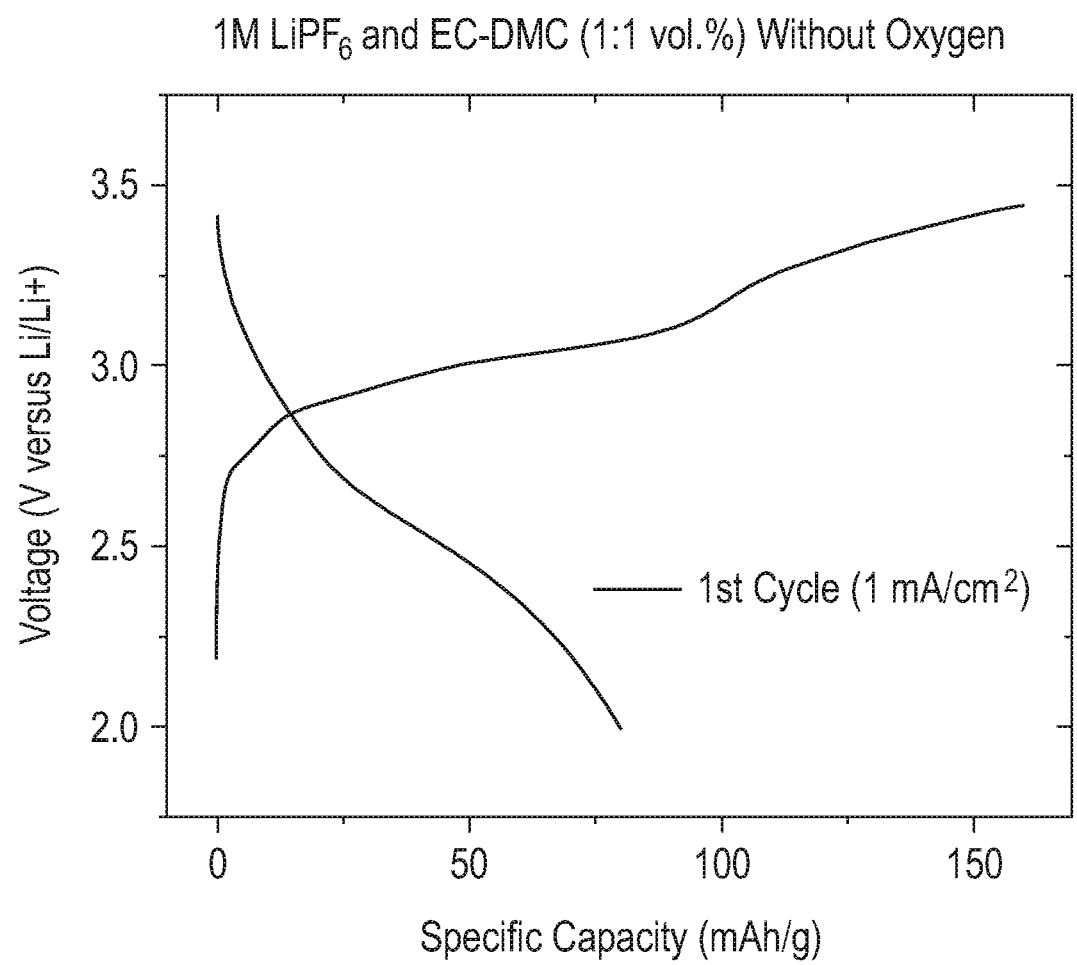
FIG. 5 is a performance profile graph for the first cycle of a rechargeable metal halide battery cell with a graphite anode, a LiI cathode, and an electrolyte solution of 1M $LiPF_6$ dissolved in ethylene carbonate dimethyl carbonate (EC-DMC) (1:1 vol. %) operated without oxygen under argon at a current density of 1 mA/cm$^2$ (Comparative Example 2).

FIG. 5 is a cycle performance graph showing the first charge/discharge cycle of a rechargeable metal halide battery comprising graphite as an anode material, LiI as an active cathode material, and an electrolyte solution of 1M $LiPF_6$ dissolved in EC-DMC (1:1 vol. %), run at a current density of 1 mA/cm$^2$, without oxygen as a catalyst (Comparative Example 2). The first cycle results of FIG. 5 show voltaic efficiency was below 70%, coulombic efficiency was below 60%, and specific capacity was less than 100 mAh/g, normalized by the amount of lithium iodide. The omission of oxygen again results in a battery with a reduced battery rechargeability and life span.

Figure 6:
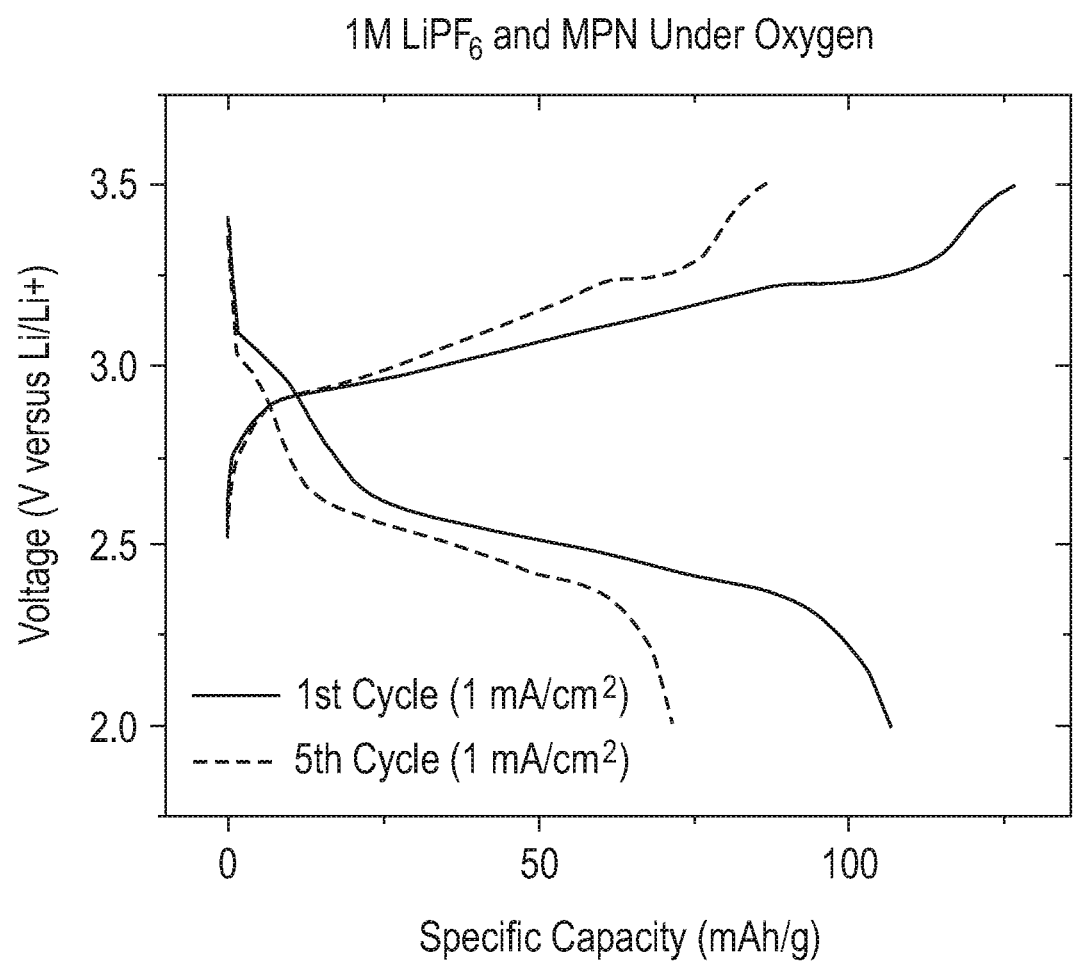
FIG. 6 is a performance profile graph for the first cycle (solid line) and the fifth cycle (dotted line) of a rechargeable metal halide battery cell with a graphite anode, a LiI cathode, and an electrolyte solution of 3-methoxypropionitrile (MPN) operated under oxygen at a current density of 1 mA/cm$^2$ (Comparative Example 3).

FIG. 6 is a cycle performance graph showing the first and fifth charge/discharge cycles of a rechargeable metal halide battery comprising graphite as an anode material, LiI as an active cathode material, 3-methoxypropionitrile (MPN) as an electrolyte solution, and oxygen as a catalyst, run at a current density of 1 mA/cm$^2$ (Comparative Example 3). The MPN represents an electrolyte solution that does not contain a carbonate ester. The first cycle results of FIG. 6 show voltaic and coulombic efficiency both below 80% and specific capacity greater than 100 mAh/g, normalized by the amount of lithium iodide. At the fifth cycle, the specific capacity was reduced to less than 80 mAh/g, representing less than 80% of the battery's original capacity. The results of FIG. 6 demonstrate that the carbonate ester electrolytes run under oxygen as described herein have superior rechargeability and efficiency in comparison to a nitrile ester electrolyte, such as MPN.

Figure 8:
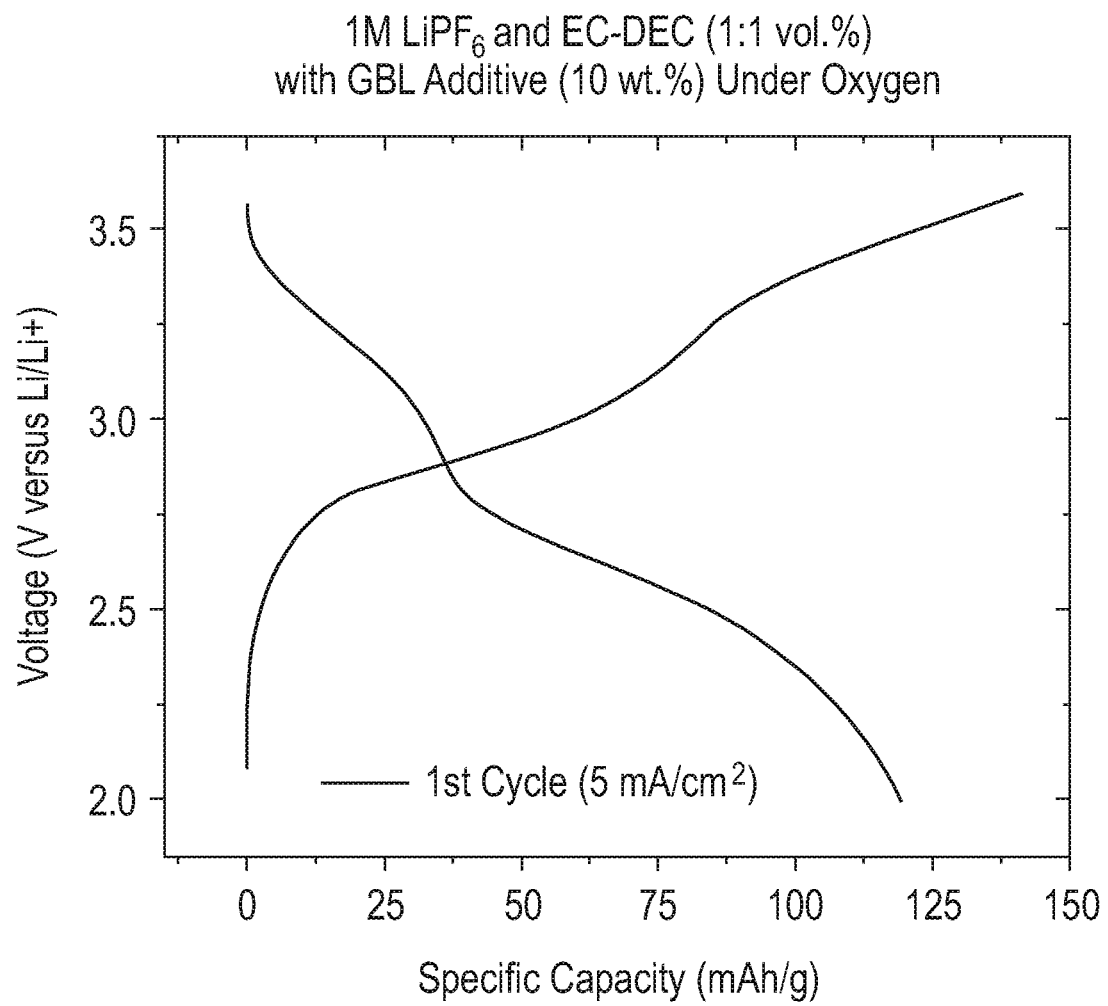
FIG. 8 is a performance profile graph for the first cycle of a rechargeable metal halide battery cell with a graphite anode, a LiI cathode, and an electrolyte solution of 1M $LiPF_6$ and a gamma-butyrolactone (GBL) additive (10 wt. %) dissolved in EC-DEC (1:1 vol. %) operated under oxygen at a current density of 5 mA/cm$^2$ (Example 5).

FIG. 8 is a cycle performance graph showing the first charge/discharge cycle for a rechargeable metal halide battery comprising graphite as an anode material, LiI as an active cathode material, an electrolyte solution of 1M LiPF$_6$ plus the electrolyte additive GBL (10 wt. %) dissolved in EC-DEC (1:1 vol. %), and oxygen as a catalyst, run at a current density of 5 mA/cm$^2$ (Example 5). The first cycle results of FIG. 8 show voltaic and coulombic efficiency both in excess of 85%, and specific capacity greater than 100 mAh/g, normalized by the amount of lithium iodide.

Figure 9:
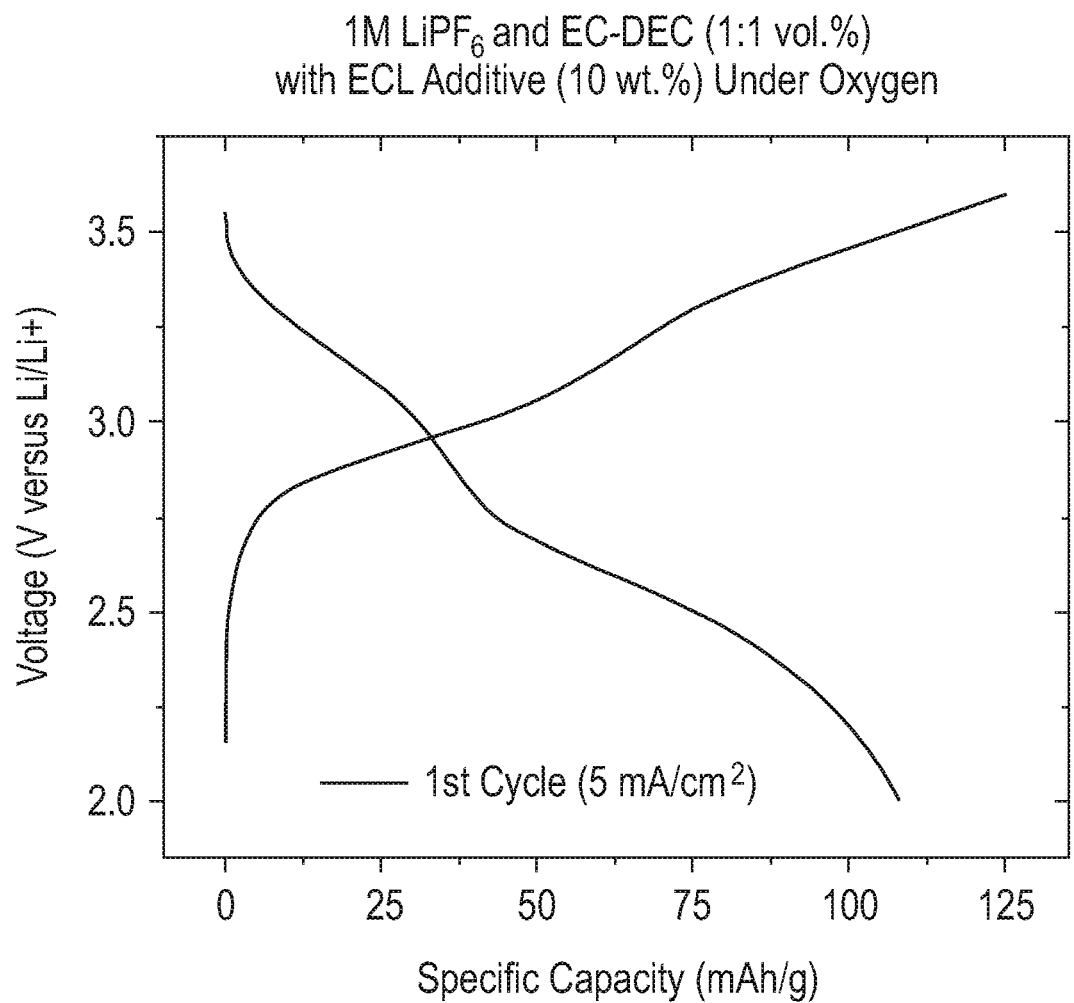
FIG. 9 is a performance profile graph for the first cycle of a rechargeable metal halide battery cell with a graphite anode, a LiI cathode, and an electrolyte solution of 1M $LiPF_6$ and an epsilon-caprolactone (ECL) additive (10 wt. %) dissolved in EC-DEC (1:1 vol. %) operated under oxygen at a current density of 5 mA/cm$^2$ (Example 6).

FIG. 9 is a cycle performance graph showing the first charge/discharge cycle for a rechargeable metal halide battery comprising graphite as an anode material, LiI as an active cathode material, an electrolyte solution of 1M LiPF$_6$ plus the electrolyte additive ECL (10 wt. %) dissolved in EC-DEC (1:1 vol. %), and oxygen as a catalyst, run at a current density of 5 mA/cm$^2$ (Example 6). The first cycle results of FIG. 9 show voltaic and coulombic efficiency both in excess of 80%, and specific capacity greater than 100 mAh/g, normalized by the amount of lithium iodide.

Figure 10:
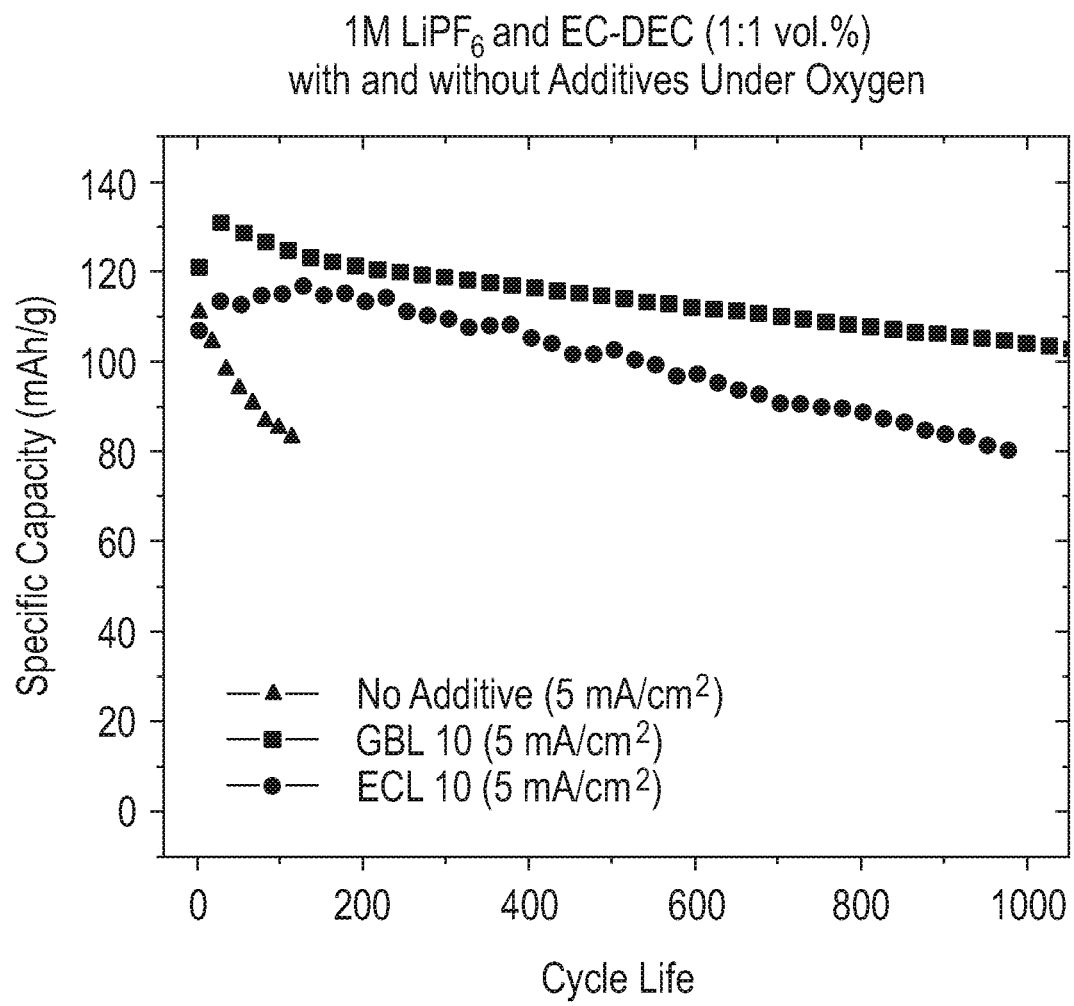
FIG. 10 is a cycle life graph for a rechargeable metal halide battery cell with a graphite anode, a LiI cathode, and an electrolyte solution comprising 1M $LiPF_6$ dissolved in EC-DEC electrolyte (1:1 vol. %) without any additive and also with the additive GBL (10 wt. %) and separately ECL (10 wt. %) operated under oxygen at a current density of 5 mA/cm$^2$ (Example 7).

FIG. 10 is a cycle life graph that compares different electrolyte solutions in rechargeable metal halide battery cells comprising graphite as an anode material and LiI as an active cathode material, with the batteries operated under oxygen at a current density of 5 mA/cm$^2$. The electrolyte solutions subject to comparison are (1) 1M LiPF$_6$ EC-DEC (1:1 vol. %) (without an additive); (2) 1M LiPF$_6$ EC-DEC (1:1 vol. %) with GBL additive (10 wt. %); and (3) 1M LiPF$_6$ EC-DEC (1:1 vol. %) with ECL additive (10 wt. %) (Example 7). As shown in FIG. 10, the battery cells with the GBL and ECL electrolyte additives demonstrate prolonged life cycle (>500) in comparison to the battery without an electrolyte additive. The battery with the GBL additives achieves near 1000 cycles at 80% of its initial capacity and maintains above 100 mAh/g of discharge capacity at the 1000$^{th}$ cycle.

Figure 11:
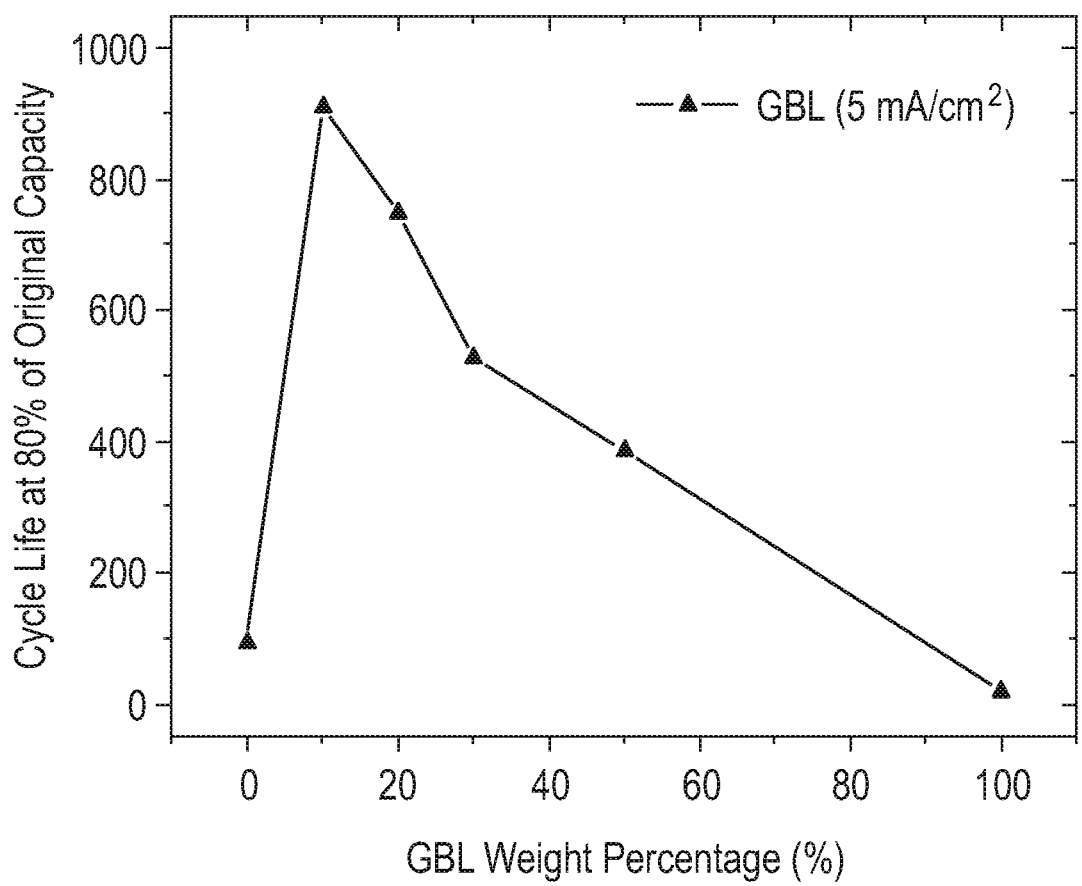
FIG. 11 is a cycle life graph for a rechargeable metal halide battery cell with a graphite anode, a LiI cathode, and an electrolyte solution comprising 1M $LiPF_6$ dissolved in EC-DEC electrolyte (1:1 vol. %) with different GBL weight fractions operated under oxygen at a current density of 5 mA/cm$^2$ (Example 8).

FIG. 11 is a cycle life graph that compares different weight percentages of the electrolyte additive GBL in rechargeable metal halide battery cells comprising graphite as an anode material and LiI as an active cathode material, the batteries being operated under oxygen at a current density 5 mA/cm$^2$. The electrolyte solution is 1 M LiPF$_6$ dissolved in EC-DEC (1:1 vol. %) with GBL added to the electrolyte solution in the following weight percentages: 0%, 10%, 20%, 30%, 50%, and 100% (Example 8). As shown in FIG. 11, the electrolyte solution with 10 wt % of GBL shows the longest cycle life of 912 charge/discharge cycles at 80% of its best cycle capacity and above 1000 at 80% of its first cycle capacity (cf, FIG. 10). The battery cells with greater than 10 wt % of GBL in the electrolyte solution show decreases in cycle life. At 100 wt % of GBL, the battery runs less than 20 charge/discharge cycles.

Figure 12:
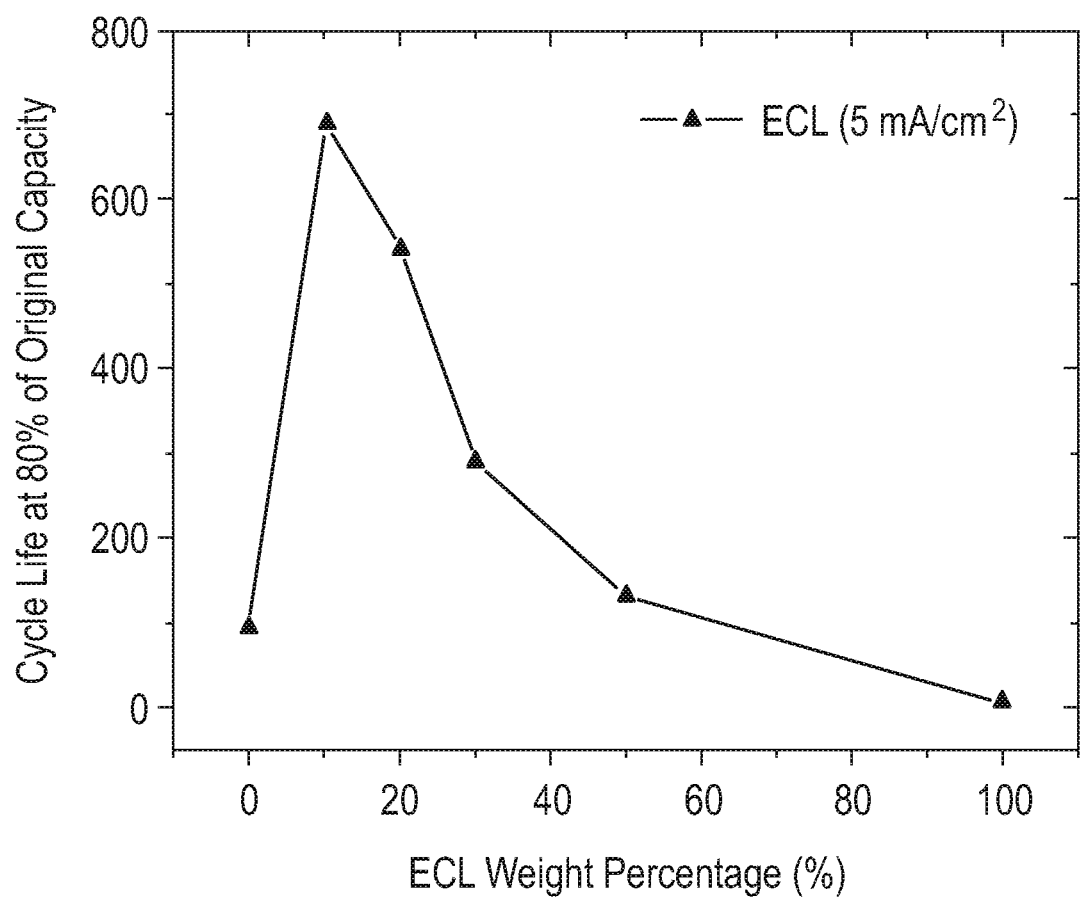
FIG. 12 is a cycle life graph for a rechargeable metal halide battery cell with a graphite anode, a LiI cathode, and an electrolyte solution comprising 1M $LiPF_6$ dissolved in EC-DEC electrolyte (1:1 vol. %) with different ECL weight fractions operated under oxygen at a current density of 5 mA/cm$^2$ (Example 9).

FIG. 12 is a cycle life graph that compares different weight percentages of the electrolyte additive ECL in rechargeable metal halide battery cells comprising graphite as an anode material and LiI as an active cathode material, with the batteries operated under oxygen at a current density 5 mA/cm$^2$. The electrolyte solution is 1 M LiPF$_6$ dissolved in EC-DEC (1:1 vol. %) with ECL added to the electrolyte solution in the following weight percentages: 0%, 10%, 20%, 30%, 50%, and 100% (Example 9). As shown in FIG. 12, the electrolyte solution with 10 wt % of ECL shows the longest cycle life of 689 charge/discharge cycles at 80% of its best cycle capacity and above 900 at 80% of its first cycle capacity (cf, FIG. 10). The battery cells with greater than 10 wt % of ECL in the electrolyte solution shows decreases in cycle life. At 100 wt % of ECL, the battery runs less than 10 charge/discharge cycles.

The figures and Examples provided herein show that the combination of an intercalation anode (such as graphite), a metal halide cathode, a carbonate ester-based electrolyte, at least one cyclic ester additive, and an oxidizing gas is able to improve the life cycle of a rechargeable battery by more than 900%, achieving near 100 cycles at 80% of the original capacity (e.g., FIGS. 10-12, Examples 7-9).

The descriptions of the various aspects and/or embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the aspects and/or embodiments, the practical application or technical improvement over technologies found in the marketplace, or to enable others of ordinary skill in the art to understand the aspects and/or embodiments disclosed herein.

EXPERIMENTAL

The following examples are set forth to provide those of ordinary skill in the art with a complete disclosure of how to make and use the aspects and/or embodiments of the invention as set forth herein. While efforts have been made to ensure accuracy with respect to variables such as amounts, temperature, etc., experimental error and deviations should be taken into account. Unless indicated otherwise, parts are parts by weight, temperature is degrees centigrade, and pressure is at or near atmospheric. All components were obtained commercially unless otherwise indicated.

The same materials and cell fabrication techniques were used for each of the Examples. The following materials were purchased from Sigma Aldrich (St. Louis, MO, USA): 1M lithium hexafluorophosphate (LiPF$_6$), ethylene carbonate (EC) diethyl carbonate (DEC) (1:1 vol. %) electrolyte solution; gamma-butyrolactone (GBL); epsilon-caprolactone (ECL); and lithium iodide (LiI). The foregoing materials were dried and stored in an argon filled glovebox (<0.1 ppm H$_2$O, O$_2$). The LiI cathode was prepared by incorporating LiI onto a carbon cloth current collector with a mass loading of 3 oz/yd$^2$ (102 g/m2) (ZOLTEK® PX30, Zoltek Corporation, St. Louis, MO, USA). GBL or ECL were used as electrolyte additives and evaluated at different weight ratios in the presence of an oxidizing gas. A CELGARD® (Celgard, LLC, Charlotte, NC, USA) separator was placed in between the graphite anode and the LiI cathode. The electrolyte solution was used to wet the separator. All cell assembly was done in the argon filled glovebox. All cell components were placed in a cell equipped with inlet and outlet SWAGELOK® (Swagelok Company, Solon, OH, USA) tubing for oxygen flow. After oxygen was introduced from the inlet tubing outside of the argon filled glovebox, the cell was completely sealed by closing the valves of both the inlet and the outlet tubing.

Example 1

Rechargeable Lithium Iodide Graphite Cell Performance 1M $LiPF_6$ EC-DEC Electrolyte (1:1 Vol. %) Under Oxygen (at 1 $mA/cm^2$)

A rechargeable lithium iodide battery with a graphite anode, 1M $LiPF_6$ as an active cathode material, and an electrolyte solution of EC-DEC (1:1 vol. %) was operated under oxygen at a current density of 1 $mA/cm^2$. FIG. 1 shows the voltaic efficiency, coulombic efficiency, and specific capacity (normalized by the amount of lithium iodide) at the first charge/discharge cycle.

Comparative Example 1

Rechargeable Lithium Iodide Graphite Cell Performance 1M $LiPF_6$ EC-DEC Electrolyte (1:1 Vol. %) Under Argon (at 1 $mA/cm^2$)

A rechargeable lithium iodide battery with a graphite anode, 1M $LiPF_6$ as an active cathode material, and an electrolyte solution of 1M $LiPF_6$ EC-DEC (1:1 vol. %) was operated under argon at a current density of 1 $mA/cm^2$. FIG. 2 shows the voltaic efficiency, coulombic efficiency, and specific capacity (normalized by the amount of lithium iodide) at the first charge/discharge cycle.

Example 2

Rechargeable Lithium Iodide Graphite Cell Performance 1M $LiPF_6$ EC-DPC Electrolyte (1:1 Vol. %) Under Oxygen (at 1 $mA/cm^2$)

A rechargeable lithium iodide battery with a graphite anode, 1M $LiPF_6$ as an active cathode material, and an electrolyte solution of 1M $LiPF_6$ EC-DPC (1:1 vol. %) was operated under oxygen at a current density of 1 $mA/cm^2$. FIG. 3 shows the voltaic efficiency, coulombic efficiency, and specific capacity (normalized by the amount of lithium iodide) at the first charge/discharge cycle.

Example 3

Rechargeable Lithium Iodide Graphite Cell Performance 1M $LiPF_6$ EC-EMC Electrolyte (1:1 Vol. %) Under Oxygen (at 1 $mA/cm^2$)

A rechargeable lithium iodide battery with a graphite anode and an electrolyte solution of 1M $LiPF_6$ EC-EMC (1:1 vol. %) was operated under oxygen at a current density of 1 $mA/cm^2$. FIG. 4 shows the voltaic efficiency, coulombic efficiency, and specific capacity (normalized by the amount of lithium iodide) at the first charge/discharge cycle.

Comparative Example 2

Rechargeable Lithium Iodide Graphite Cell Performance 1M $LiPF_6$ EC-DMC Electrolyte (1:1 Vol. %) Under Argon (at 1 $mA/cm^2$)

A rechargeable lithium iodide battery with a graphite anode and an electrolyte solution of 1M $LiPF_6$ EC-DMC (1:1 vol. %) was operated under argon at a current density of 1 $mA/cm^2$. FIG. 5 shows voltaic efficiency, coulombic efficiency, and specific capacity (normalized by the amount of lithium iodide) at the first charge/discharge cycle.

Comparative Example 3

Rechargeable Lithium Iodide Graphite Cell Performance MPN Electrolyte Under Oxygen A rechargeable lithium iodide battery with a graphite anode and an electrolyte solution of MPN was operated under oxygen at a current density of 1 $mA/cm^2$. FIG. 6 shows voltaic efficiency, coulombic efficiency, and specific capacity (normalized by the amount of lithium iodide) at the first and fifth charge/discharge cycles.

Example 4

Rechargeable Lithium Iodide Graphite Cell Performance 1M $LiPF_6$ EC-DEC Electrolyte (1:1 Vol. %) Under Oxygen (at 5 $mA/cm^2$)

A rechargeable lithium iodide battery with a graphite anode and an electrolyte solution of 1M $LiPF_6$ EC-DEC (1:1 vol. %) was operated under oxygen at a current density of 5 $mA/cm^2$. FIG. 7 shows voltaic efficiency, coulombic efficiency, and specific capacity (normalized by the amount of lithium iodide) at the first charge/discharge cycle.

Example 5

Rechargeable Lithium Iodide Graphite Cell Performance 1M $LiPF_6$ EC-DEC Electrolyte (1:1 Vol. %) with GBL Additive (10 wt. %) Under Oxygen (at 5 $mA/cm^2$)

A rechargeable lithium iodide battery with a graphite anode and an electrolyte solution of 1M $LiPF_6$ EC-DEC (1:1 vol. %) with the electrolyte additive, GBL (10 wt. %), was operated under oxygen at a current density of 5 $mA/cm^2$. FIG. 8 shows voltaic efficiency, coulombic efficiency, and specific capacity (normalized by the amount of lithium iodide) at the first charge/discharge cycle.

Example 6

Rechargeable Lithium Iodide Graphite Cell Performance 1M $LiPF_6$ EC-DEC Electrolyte (1:1 Vol. %) with ECL Additive (10 wt. %) Under Oxygen (at 5 $mA/cm^2$)

A rechargeable lithium iodide battery with a graphite anode and an electrolyte solution of 1M $LiPF_6$ EC-DEC (1:1 vol. %) with the electrolyte additive, ECL (10 wt. %), was operated under oxygen at a current density of 5 $mA/cm^2$. FIG. 9 shows voltaic efficiency, coulombic efficiency, and specific capacity (normalized by the amount of lithium iodide) at the first charge/discharge cycle.

Example 7

Rechargeable Lithium Iodide Graphite Cell Performance 1M LiPF$_6$ EC-DEC Electrolyte (1:1 Vol. %) with and without Additives Under Oxygen (at 5 mA/cm$^2$)

Rechargeable lithium iodide batteries with graphite anodes and the following electrolyte solutions operated under oxygen at a current density of 5 mA/cm$^2$ were compared: (1) 1M LiPF$_6$ EC-DEC (1:1 vol. %) (without an additive); (2) 1M LiPF$_6$ EC-DEC (1:1 vol. %) with GBL additive (10 wt. %); and (3) 1M LiPF$_6$ EC-DEC (1:1 vol. %) with ECL additive (10 wt. %). FIG. 10 shows the cycle life for the lithium iodide batteries as a function of specific capacity (mAh/g) for the battery with no additive, the battery with the GBL additive, and the battery with the ECL additive.

Example 8

Rechargeable Lithium Iodide Graphite Cell Performance 1M LiPF$_6$ EC-DEC Electrolyte (1:1 Vol. %) with GBL Additive at Different Weight Fractions Under Oxygen (at 5 mA/cm$^2$)

Rechargeable lithium iodide batteries with graphite anodes, 1M LiPF$_6$ EC-DEC (1:1 vol. %) electrolyte solution, and GBL additive at the following weight percentages, relative to the electrolyte, were operated under oxygen at a current density of 5 mA/cm$^2$: 0%, 10%, 20%, 30%, 50%, and 100%. FIG. 11 shows cycle life at 80% of original capacity (from Example 7) per GBL weight percentage.

Example 9

Rechargeable Lithium Iodide Graphite Cell Performance 1M LiPF$_6$ EC-DEC Electrolyte (1:1 Vol. %) With ECL Additive at Different Weight Fractions Under Oxygen (at 5 mA/cm$^2$)

Rechargeable lithium iodide batteries with graphite anodes, 1M LiPF$_6$ EC-DEC (1:1 vol. %) electrolyte solution, and ECL additive at the following weight percentages, relative to the electrolyte, were operated under oxygen at a current density of 5 mA/cm$^2$: 0%, 10%, 20%, 30%, 50%, and 100%. FIG. 12 shows cycle life at 80% of original capacity (from Example 7) per ECL weight percentage.

We claim:

1. A battery, comprising:
   an intercalation anode comprising a material selected from the group consisting of a carbon compound, a silicon compound, a titanium compound, a molybdenum compound, and combinations thereof;
   an electrically conductive cathode current collector;
   a cathode comprising an active material comprising a metal halide, wherein the metal halide is incorporated into the electrically conductive cathode current collector, and wherein the metal halide comprises an alkali metal or alkaline earth metal and a halogen;
   an electrolyte solution comprising (i) at least one selected from the group consisting of a substituted cyclic carbonate compound, a non-substituted cyclic carbonate compound, a substituted non-cyclic carbonate compound, and a non-substituted non-cyclic carbonate compound, and (ii) an ion-conducting salt comprising a metal cation [M]$^+$ and an anion [X]$^-$ having a chemical formula of [M]$^+$[X]$^-$, wherein [M]$^+$ is selected from the group consisting of Li$^+$, Mg$^{2+}$, Zn$^{2+}$, Al$^{3+}$, Na$^+$, and combinations thereof, and [X]$^-$ is selected from the group consisting of nitrate (NO$_3^-$), hexafluorophosphate (PF$_6^-$), tetrafluoroborate (BF$_4^-$), bisoxalato borate (BOB$^-$), difluorooxalato borate (DFOB$^-$), trifluoromethanesulfonate (TF$^-$), trifluoromethanesulfonylimide (TFSI$^-$), fluorosulfonylimide (FSI$^-$), and combinations thereof; and
   an oxidizing gas in contact with the intercalation anode, the cathode, and the electrolyte,
   wherein the metal halide of the cathode comprises a selection from the group consisting of (i) a metal ion selected from the group consisting of Li$^+$, Mg$^+$, Na$^+$, and combinations thereof; and (ii) a halide ion selected from the group consisting of I$^-$, Br$^-$, Cl$^-$, F$^-$, and combinations thereof.

2. The battery of claim 1, wherein the cathode comprises a material selected from the group consisting of lithium iodide (LiI), lithium chloride (LiCl), lithium bromide (LiBr), lithium fluoride (LiF), sodium chloride (NaCl), sodium iodide (NaI), and combinations thereof.

3. The battery of claim 2, wherein the cathode is a conversion cathode that undergoes a reversible conversion reaction according to Formula (1) or (2):

$$2\,YZ \rightleftharpoons Z_2 + 2Y^+ + 2e^-, \quad (1)$$

where Y is an alkali metal, Z is a halogen, e$^-$ is an electron, and YZ is a conversion cathode material; or

$$YZ_2 \rightleftharpoons Z_2 + Y^{2+} + 2e^- \quad (2)$$

where Y is an alkaline earth metal, Z is a halogen, e$^-$ is an electron, and YZ$_2$ is a conversion cathode material.

4. The battery of claim 1, wherein the carbon compounds of the intercalation anode are selected from the group consisting of graphite, graphene, reduced graphene oxide (RGO), carbon nanotubes, fullerenes, silicon-carbon composites, and combinations thereof.

5. The battery of claim 4, wherein the intercalation anode comprises graphite.

6. The battery of claim 1, wherein the silicon compounds of the intercalation anode are selected from the group consisting of silicon, silicon alloys, silicon-carbon composites, and combinations thereof.

7. The battery of claim 1, wherein the titanium compounds of the intercalation anode are titanium dioxide (TiO$_2$) and/or titanium disulfide (TiS$_2$).

8. The battery of claim 1, wherein the molybdenum compounds of the intercalation anode are selected from the group consisting of molybdenum dioxide (MoO$_2$), molybdenum trioxide (MoO$_3$), molybdenum disulfide (MoS$_2$), and combinations thereof.

9. The battery of claim 1, wherein the electrically conductive cathode current collector is selected from the group consisting of carbon black, carbon paper, carbon foam, carbon fibers, carbon nanofibers, carbon nanotubes, activated carbon, amorphous carbon, graphite sheets, graphene, reduced graphene oxide, and combinations thereof.

10. The battery of claim 1, wherein the oxidizing gas is selected from the group consisting of oxygen, air, nitric oxide, nitrogen dioxide, and combinations thereof.

11. The battery of claim 1, wherein the cyclic or non-cyclic carbonate compound of the electrolyte solution is selected from the group consisting of ethylene carbonate (EC), vinylene carbonate (VC), propylene carbonate (PC), diethyl carbonate (DEC), dipropyl carbonate (DPC), dibutyl carbonate (DBC), dimethyl carbonate (DMC), ethyl methyl carbonate (EMC), ethyl propyl carbonate (EPC), ethyl butyl carbonate (EBC), ethyl salicylate carbonate (ESC), fluoro-ethylene carbonate (FEC), allyl methyl carbonate (AMC), dodecyl ethyl carbonate (DDEC), diethyl dicarbonate (DEDC), and combinations thereof.

12. The battery of claim 1, wherein the electrolyte solution further comprises at least one cyclic ester compound and wherein the at least one cyclic ester compound has a weight percent concentration in the electrolyte solution between 5% and 20%.

13. The battery of claim 12, wherein the at least one cyclic ester compound is selected from the group consisting of beta-propiolactone (BPL), beta-butyrolactone (BBL), alpha-methyl-gamma-butyrolactone (AMGBL), gamma-butyrolactone (GBL), gamma-valerolactone (GVL), delta-valerolactone (DVL), gamma-caprolactone (GCL), epsilon-caprolactone (ECL), gamma-octanolactone (GOL), gamma-nanolactone (GNL), gamma-decanolactone (GDL), delta-decanolactone (DDL), gamma-ndecanolactone (GUL), delta-undecanolactone (DUL), delta-dodecanolactone (DDDL), and combinations thereof.

14. The battery of claim 13, wherein the at least one cyclic ester compound is gamma-butyrolactone (GBL) and/or epsilon-caprolactone (ECL).

\* \* \* \* \*